(12) United States Patent
Kato et al.

(10) Patent No.: US 7,955,214 B2
(45) Date of Patent: Jun. 7, 2011

(54) AUTOMATIC TRANSMISSION

(75) Inventors: Takaaki Kato, Anjo (JP); Tsuyoshi Fukaya, Kariya (JP); Akihito Hongoya, Okazaki (JP); Hiroyuki Tsukamoto, Chiryu (JP); Masafumi Kinoshita, Toyota (JP); Masaru Morise, Nakata-gun (JP)

(73) Assignees: Aisin AW Co., Ltd., Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 364 days.

(21) Appl. No.: 12/293,746

(22) PCT Filed: Mar. 29, 2007

(86) PCT No.: PCT/JP2007/056797
§ 371 (c)(1),
(2), (4) Date: Sep. 19, 2008

(87) PCT Pub. No.: WO2007/114216
PCT Pub. Date: Oct. 11, 2007

(65) Prior Publication Data
US 2010/0234164 A1    Sep. 16, 2010

(30) Foreign Application Priority Data

Mar. 29, 2006 (JP) ................... 2006-092488
Apr. 10, 2006 (JP) ................... 2006-107856

(51) Int. Cl.
*F16H 3/62* (2006.01)
(52) U.S. Cl. ........................................ 475/275
(58) Field of Classification Search ............. None
See application file for complete search history.

(56) References Cited

U.S. PATENT DOCUMENTS

| | | | |
|---|---|---|---|
| 4,660,439 A | 4/1987 | Hiraiwa | |
| 5,518,465 A * | 5/1996 | Hiraiwa | 475/275 |
| 6,752,738 B1 * | 6/2004 | Martin et al. | 475/276 |
| 2010/0234164 A1 * | 9/2010 | Kato et al. | 475/271 |

FOREIGN PATENT DOCUMENTS

| | | |
|---|---|---|
| JP | 60-065943 A | 4/1985 |
| JP | 10-281239 A | 10/1998 |
| JP | 2000-046129 A | 2/2000 |
| JP | 2001-263438 A | 9/2001 |
| JP | 2002-161951 A | 6/2002 |
| JP | 2002-213545 A | 7/2002 |

* cited by examiner

*Primary Examiner* — Dirk Wright
(74) *Attorney, Agent, or Firm* — Sughrue Mion, PLLC

(57) ABSTRACT

An automatic transmission is provided having appropriately spaced gear ratios for eight forward speeds to be capable of obtaining a shift feeling in all of the eight speeds, and is reduced in size and weight. Rotation of an input shaft is transmitted to an output shaft at a speed selected from a plurality of shift speeds by first and second clutches selectively transmitting the rotation of the input shaft to first and second compound planetary gears, and by first to fourth brakes selectively fixing each element of the first and second compound planetary gears, the first compound planetary gear includes first and second sun gears, a common carrier rotatably supporting a long pinion and a pinion, and a common ring gear that meshes with the first sun gear through the long pinion or the pinion and also meshes with the second sun gear through the long pinion and the pinion.

9 Claims, 18 Drawing Sheets

FIG. 2

| | C-1 | C-2 | C-3 | B-1 | B-2 | B-3 | B-4 | F-1 |
|---|---|---|---|---|---|---|---|---|
| 1st | ○ | | | ● | | | (○) | ○ |
| 2nd | ○ | | | ● | ○ | | | |
| 3rd | ○ | | ○ | ○ | | | | |
| 4th | ○ | | ○ | | | ○ | | |
| 5th | ○ | ○ | ● | | | | | |
| 6th | | ○ | ○ | | | ○ | | |
| 7th | | ○ | ○ | ○ | | | | |
| 8th | | ○ | | ● | ○ | | | |
| Rev1 | | | ○ | ○ | | | ○ | |
| Rev2 | | | ○ | | | ○ | ○ | |

FIG. 16

|     | C-1 | C-2 | B-1 | B-2 | B-3 | B-4 | F-1 |
|-----|-----|-----|-----|-----|-----|-----|-----|
| 1st | ○   |     |     |     |     | (○) | ○   |
| 2nd | ○   |     |     | ○   |     |     |     |
| 3rd | ○   |     | ○   |     |     |     |     |
| 4th | ○   |     |     |     | ○   |     |     |
| 5th | ○   | ○   |     |     |     |     |     |
| 6th |     | ○   |     |     | ○   |     |     |
| 7th |     | ○   | ○   |     |     |     |     |
| 8th |     | ○   |     | ○   |     |     |     |
| Rev1 |    |     | ○   |     |     | ○   |     |
| Rev2 |    |     |     |     | ○   | ○   |     |

AUTOMATIC TRANSMISSION

The disclosure of PCT Application No. PCT/JP2007/056797 filed on Mar. 29, 2007 including the specification, drawings and abstract is incorporated herein by reference in its entirety.

BACKGROUND OF THE INVENTION

1. Field of the Invention

The present invention relates to an automatic transmission for transmitting rotation of an input shaft to an output shaft at a speed selected from a plurality of shift speeds by making each element of first and second compound planetary gears capable of being connected to the input shaft through a clutch, and also capable of being fixed through a brake.

2. Description of the Related Art

Japanese Patent Application Publication No. JPA-2002-161951 (pp. 5 to 8, FIG. 5) discloses an automatic transmission that includes a double-pinion type simple planetary gear unit that has a carrier supporting a pair of intermeshing pinions, a sun gear meshing with one of the pair of pinions, and a ring gear meshing with the other pinion, and also includes, on the common axis line, a compound planetary gear unit that has a former-stage and a later-stage sun gears, a former-stage and a later-stage ring gears, a former-stage carrier supporting a pinion meshing with the former-stage sun gear and the former-stage ring gear, and a later-stage carrier supporting a pinion meshing with the later-stage sun gear and the later-stage ring gear, and that directly interconnects the former-stage and later-stage sun gears and also directly connects the former-stage carrier and the later-stage ring gear. The automatic transmission directly connects an output shaft to the later-stage carrier, selectively transmits rotation of an input shaft to the directly connected former-stage and later-stage sun gears through a first clutch, selectively transmits the rotation of the input shaft to the directly interconnected former-stage carrier and later-stage ring gear through a second clutch, and selectively transmits the rotation of the input shaft to the sun gear of the simple planetary gear unit through a third clutch. The automatic transmission also includes a first brake directly connecting the ring gear of the simple planetary gear unit to the former-stage ring gear of the compound planetary gear unit to fix the carrier of the simple planetary gear unit, a second brake fixing the directly interconnected ring gear of the simple planetary gear unit and former-stage ring gear of the compound planetary gear unit, the third brake fixing the sun gear of the simple planetary gear unit through a one-way clutch, and a fourth brake fixing the directly interconnected former-stage carrier and later-stage ring gear of the compound planetary gear unit. Thus, the automatic transmission establishes five forward speeds and one reverse speed gear ratios by selectively engaging the first, second, and third clutches, and the first, second, third, and fourth brakes.

Japanese Patent Application Publication No. JPA-2002-213545 (p. 5, FIGS. 1 and 2) discloses an automatic transmission in which a common sun gear directly connected to an input shaft is meshed with a first ring gear through a small-diameter pinion of a stepped pinion supported by a carrier, and in which a compound planetary gear for deceleration meshed with a second ring gear through a large-diameter pinion of the stepped pinion is directly connected with a sun gear of a first single-pinion planetary gear and with a sun gear of a second single-pinion planetary gear. The automatic transmission is provided with a compound planetary gear for shifting in which a carrier of the first single-pinion planetary gear and a ring gear of the second single-pinion planetary gear are directly interconnected, a first clutch selectively connecting the input shaft with a directly connected sun gear of the compound planetary gear for shifting, a second clutch selectively connecting the input shaft with the directly connected carrier and ring gear of the compound planetary gear for shifting, a first brake selectively fixing a first ring gear of the compound planetary gear for deceleration, a second brake selectively fixing a second ring gear of the compound planetary gear for deceleration, a third brake selectively fixing a directly connected carrier of the compound planetary gear for deceleration and a ring gear of the first single-pinion planetary gear, a fourth brake selectively fixing the directly connected carrier and ring gear of the compound planetary gear for shifting, and an output shaft directly connected to a carrier of the second single-pinion planetary gear. Thus, the automatic transmission changes rotation of the input shaft into one of eight forward speeds and one reverse speed, and transmits the rotation to the output shaft.

The automatic transmission described in JP-A-2002-161951 can shift between five forward speeds and one reverse speed gear ratios in a smooth and stable manner. However, in recent years, there are demands for multi-speed automatic transmissions to improve fuel consumption and power transmission performance, or to obtain gear ratios suited to the driver's taste. The automatic transmission described in JP-A-2002-213545 responds to such demands by enabling to obtain gear ratios of eight forward speeds and one reverse speed.

However, referring to the gear ratios of the automatic transmission disclosed in JP-A-2002-213545, as shown in its FIGS. 1 to 3, the step ratio between shift speeds (gear ratio on the lower speed side/gear ratio on the higher speed side) is 1.638 between the first forward speed and the second forward speed, 1.243 between the second forward speed and the third forward speed, 1.085 between the third forward speed and the fourth forward speed, 1.509 between the fourth forward speed and the fifth forward speed, 1.529 between the fifth forward speed and the sixth forward speed, 1.053 between the sixth forward speed and the seventh forward speed, and 1.115 between the seventh forward speed and the eighth forward speed. Particularly, the step ratios between the third forward speed and the fourth forward speed, and between the sixth forward speed and the seventh forward speed are as small as less than 1.1. Thus, the step ratio of less than 1.1 indicates that the gear ratio changes only slightly between before and after shifting, and especially in driving, a driver might not be able to get a shift feeling (feeling that a shift is performed) in spite of shifting, thus, being given an uncomfortable feeling.

SUMMARY OF THE INVENTION

It is an aspect of the present invention to provide an automatic transmission that includes appropriately spaced gear ratios for eight forward speeds to be capable of obtaining a shift feeling in all of the eight speeds, and that can be reduced in size and weight.

Means For Solving The Problem

According to a first aspect of the present invention, a first compound planetary gear includes first and second sun gears, a common carrier rotatably supporting a long pinion and a pinion, and a common ring gear meshing with the long pinion or the pinion. A second compound planetary gear includes fifth, sixth, seventh and eighth elements respectively corresponding in the order of arrangement to four elements that are sequentially arranged on a velocity diagram at intervals corresponding to gear ratios. An input shaft is selectively connected to the eighth element through a first clutch, and also selectively connected to the sixth element through a second clutch. The common carrier, the directly interconnected common ring gear and fifth element, the first sun gear, and the sixth element are selectively fixed by first to fourth brakes.

As a result, compared with a known automatic transmission in which a first ring gear and a second ring gear are aligned with the third brake in the direction of the axis line, the automatic transmission according to the present invention has the common ring gear of the first compound planetary gear aligned with the third brake in the direction of the axis line. Therefore, the overall length can be made shorter. Thus, it is possible to provide an automatic transmission having gear ratios for eight forward speeds, with small size, light weight, and low cost.

In addition, according to the present invention, in an automatic transmission with eight forward speeds and two reverse speeds whose large number of shift speeds makes difficult the obtaining of appropriate amounts of step ratios between shift speeds, all step ratios between shift speeds can be made to be appropriate amounts using normally usable numbers of teeth, thus enabling to effectively use a desired engine speed range. Moreover, a driver can have an appropriate shift feeling that the shifting has been performed for all of the eight shift speeds.

According to a second aspect of the present invention, the second compound planetary gear includes directly interconnected third and fourth sun gears, the third and fourth carriers respectively rotatably supporting the third and fourth pinions, the third ring gear meshing with the third sun gear through the third pinion, and the fourth ring gear that meshes with the fourth sun gear through the fourth pinion and also directly connected to the third carrier. As a result, each step ratio between shift speeds can be made to be 1.1 or more. In other words, a simply structured automatic transmission of eight forward speeds with satisfactory step ratios can be provided.

According to a third aspect of the present invention, because the intermediate shaft rotatably supported between the input shaft and the output shaft can be connected to the input shaft through the first clutch, and also because the intermediate shaft is provided as a unit with the third sun gear and the fourth sun gear of the second compound planetary gear, the rotation of the input shaft can be transmitted to the directly interconnected third and fourth sun gears of the second compound planetary gear with a simple and compact structure.

According to a fourth aspect of the present invention, because the cylindrical connecting shaft, which is directly connected to the third carrier of the second compound planetary gear and is also connectable to the input shaft through the second clutch, is rotatably supported by the intermediate shaft, and because the second sun gear of the first compound planetary gear is rotatably supported by the connecting shaft, and further because the first sun gear is rotatably supported by the second sun gear, the rotation of the input shaft can be transmitted to the third carrier through the second clutch with a simple structure, and also the first and second sun gears can be compactly arranged to be aligned in the direction of the axis line.

According to a fifth aspect of the present invention, because a third clutch for selectively transmitting the rotation of the input shaft to the second sun gear is provided, disengaging the third clutch at the first speed can prevent the first sun gear of the first compound planetary gear from making reverse rotation which causes a large relative rotation with respect to the second sun gear.

According to a sixth aspect of the present invention, because the third clutch for selectively transmitting the rotation of the second element (the common ring gear) of the first compound planetary gear to the fifth element of the second compound planetary gear is provided, disengaging the third clutch at the first speed can prevent the fourth element (the first sun gear) of the first compound planetary gear from making reverse rotation which causes a large relative rotation with respect to the first element (the second sun gear).

BRIEF DESCRIPTION OF THE DRAWINGS

FIG. 2 is a view showing an operation table of brakes and clutches at each shift speed according to the first embodiment.

FIG. 16 is a view showing an operation table of brakes and clutches at each shift speed according to the fifth embodiment.

DETAILED DESCRIPTION OF NON-LIMITING EMBODIMENTS OF THE INVENTION

Figure 1:
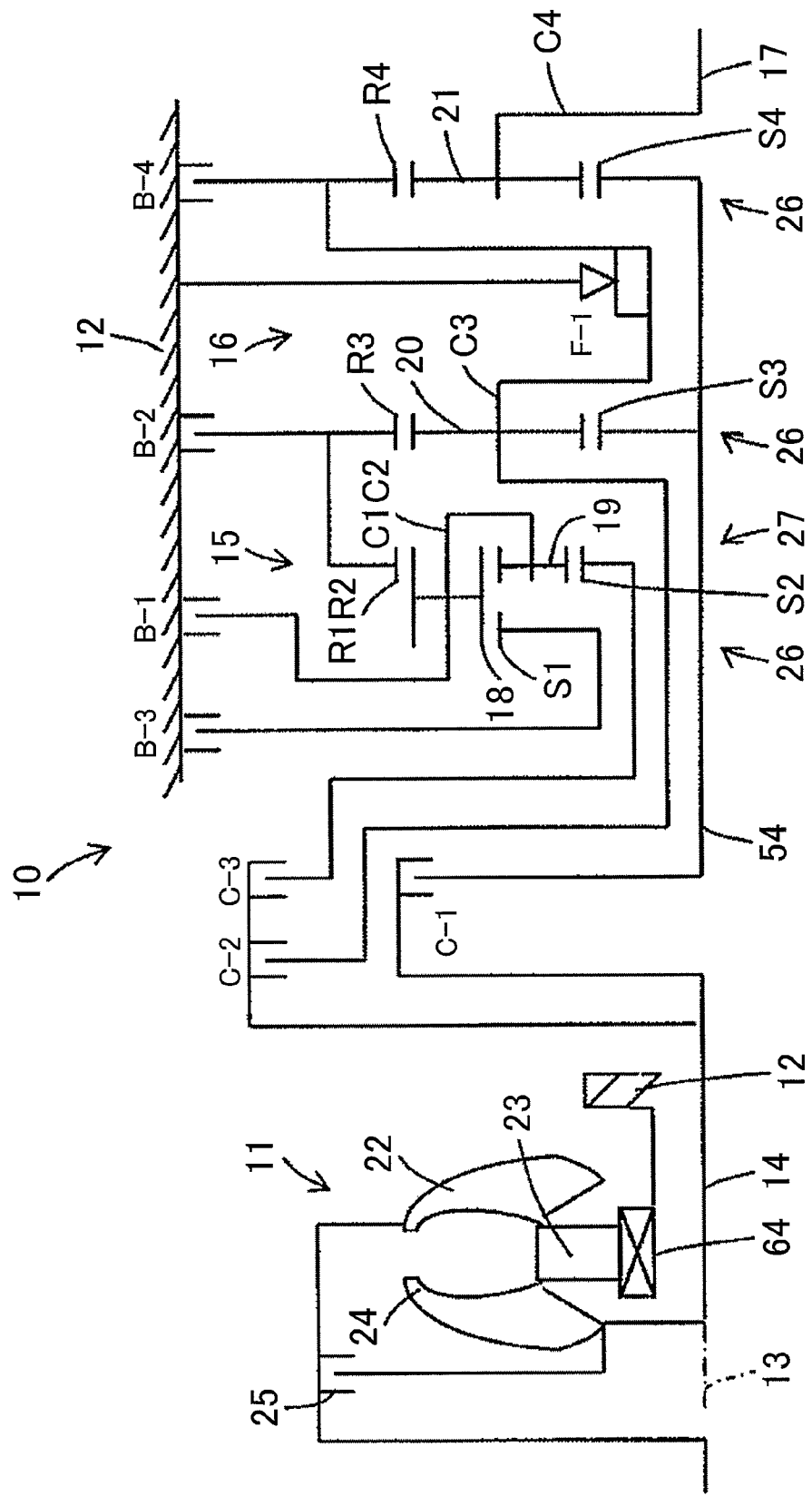
FIG. 1 is a skeleton diagram showing a first embodiment of an automatic transmission according to the present invention.

A first non-limiting embodiment of an automatic transmission according to the present invention will be described below based on the drawings. In FIG. 1, reference numeral 10 denotes an automatic transmission according to the present invention, which is used, for example, to transmit output rotation of a fluid torque converter 11 rotationally driven by an automobile engine to driving wheels with a speed change. The automatic transmission 10 is composed of components such as an input shaft 14; a first compound planetary gear 15; a second compound planetary gear 16; an output shaft 17; first, second, and third clutches C-1, C-2, and C-3; first, second, third, and fourth brakes B-1, B-2, B-3, and B-4; and a one-way clutch F-1, which are sequentially supported on a common axis line 13 in a transmission case 12 attached to a vehicle body.

The first compound planetary gear 15 is composed of first and second sun gears S1 and S2 respectively rotatably supported on the common axis line 13, a common carrier C1C2 rotatably supporting a long pinion 18 and a pinion 19 that are meshing with each other, and a common ring gear R1R2 that meshes with the first sun gear S1 through the long pinion 18 and also meshes with the second sun gear S2 through the long pinion 18 and the pinion 19.

The second compound planetary gear 16 is composed of third and fourth sun gears S3 and S4 rotatably supported on the common axis line 13 and directly connected to each other, third and fourth carriers C3 and C4 supporting third and fourth pinions 20 and 21, a third ring gear R3 meshed with the third sun gear S3 through the third pinion 20, and a fourth ring gear R4 that is meshed with the fourth sun gear S4 through the fourth pinion 21 and directly connected to the third carrier C3. The term "directly connected" indicates being directly coupled without an intermediate clutch.

In the first compound planetary gear 15, the first sun gear S1 is made possible to be fixed through the third brake B-3; the second sun gear S2 is made connectable to the input shaft 14 through the third clutch C-3; the common carrier C1C2 is made possible to be fixed through the first brake B-1; and a common ring gear R1R2 is directly connected to the third ring gear R3 of the second compound planetary gear 16.

In the second compound planetary gear 16, the directly interconnected third and fourth sun gears S3 and S4 are made connectable to the input shaft 14 through the first clutch C-1; the directly interconnected third carrier C3 and fourth ring gear R4 are made connectable to the input shaft 14 through the second clutch C-2, and also made possible to be fixed through the fourth brake B-4, as well as being prevented from reverse rotation by connecting to the case 12 through the one-way clutch F-1 arranged in parallel with the fourth brake B-4; the third ring gear R3 is made possible to be fixed through the second brake B-2; and the fourth carrier C4 is directly connected to the output shaft 17.

Note that a pump impeller 22 of the fluid torque converter 11 is rotationally driven by an unshown engine to discharge oil so that a stator 23 receives the reaction force of the oil to generate torque for a turbine 32. The input shaft 14 is directly connected to the turbine 32. Reference numeral 25 denotes a lock-up clutch for making possible the connection between the pump impeller 22 and the turbine 32.

The automatic transmission 10 structured as described above selectively engages the first to third clutches C-1 to C-3, selectively engages the first to fourth brakes B-1 to B-4, and selectively connects or fixes the input shaft 14, the output shaft 17, and each element of the first compound planetary gear 15 and the second compound planetary gear 16, thereby achieving eight forward speeds and two reverse speeds. In the operation table of FIG. 2, a white circle in each of the columns for the first to third clutches C-1 to C-3, the first to fourth brakes B-1 to B-4, and the one-way clutch F-1 corresponding to each shift speed indicates a connected state by engagement in the case of a clutch, and a fixed state by engagement in the case of a brake. A black circle indicates a state in which torque is transmitted in the case of a clutch, and a state in which reaction force is not supported in the case of a brake, although hydraulic pressure is supplied to hydraulic servo in preparation for shifting speed smoothly.

For a single-pinion planetary gear 26 of the first and second compound planetary gears 15 and 16, the relation among a rotational speed Ns of the sun gear, a rotational speed Nc of the carrier, a rotational speed Nr of the ring gear, and a gear ratio $\lambda$ of the single-pinion planetary gear is represented by formula (1), whereas for a double-pinion planetary gear 27, the relation among the rotational speed Ns of the sun gear, the rotational speed Nc of the carrier, the rotational speed Nr of the ring gear, and the gear ratio $\lambda$ of the double-pinion planetary gear is represented by formula (2). The gear ratios at each shift speed are calculated based upon the formulas (1) and (2). Denoting the numbers of teeth of the first to fourth sun gears S1, S2, S3, and S4 as Zs1, Zs2, Zs3, and Zs4, respectively, and the numbers of teeth of the common ring gear R1R2, and the third and fourth ring gears R3 and R4 as Zr12, Zr3, and Zr4, respectively, the gear ratios of the single-pinion planetary gear 26 and the double-pinion planetary gear 27 are $\lambda 1 = Zs1/Zr12$, $\lambda 2 = Zs2/Zr12$, $\lambda 3 = Zs3/Zr3$, and $\lambda 4 = Zs4/Zr4$.

$$Nr = (1+\lambda)Nc - \lambda Ns \qquad (1)$$

$$Nr = (1-\lambda)Nc + \lambda Ns \qquad (2)$$

Figure 3:
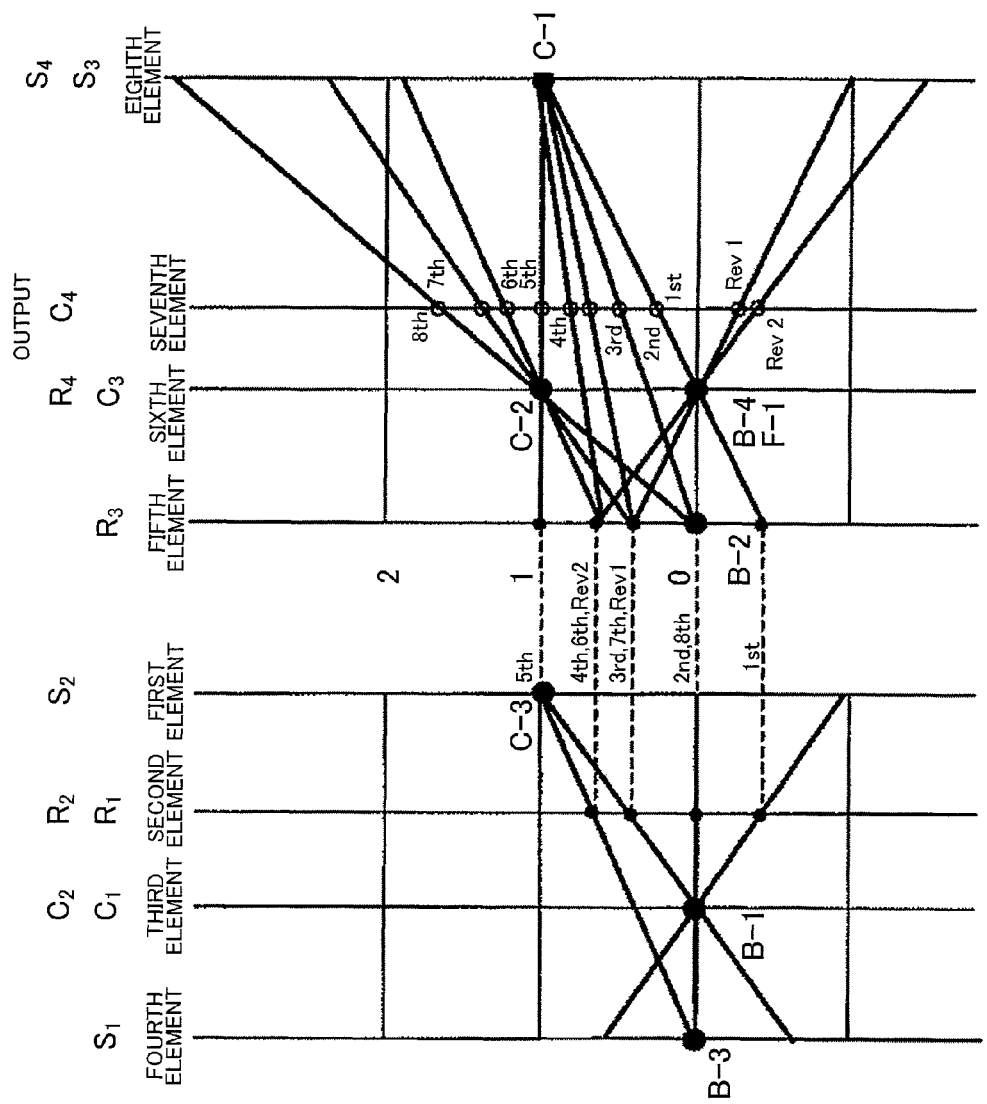
FIG. 3 is a velocity diagram showing a rotation ratio of each element of a planetary gear at each shift speed according to the first embodiment.

When the first to third clutches C-1 to C-3 are selectively engaged and the first to fourth brakes B-1 to B-4 are selectively engaged, the speed ratio of each element of the first and second compound planetary gears 15 and 16 becomes as shown in the velocity diagram of FIG. 3. The velocity diagram allocates each element composed of the sun gears, carriers and ring gears of the planetary gears at intervals corresponding to the gear ratios along the horizontal axis, and plots the speed ratios corresponding to each element along the vertical axis. In FIG. 3, the velocity diagrams of the first and second compound planetary gears 15 and 16 are shown side by side. In the first compound planetary gear 15, the first carrier C1 and the second carrier C2 of the single-pinion planetary gear 26 and double-pinion planetary gear 27, and the first ring gear R1 and second ring gear R2 are respectively used in common; therefore, the speed ratios of the common carrier C1C2 and the common ring gear R1R2 are represented on each one of the vertical lines labeled C1, C2 and R1, R2, respectively. In the second compound planetary gear 16, the third and fourth sun gears S3 and S4 of the single-pinion planetary gear 26 are directly interconnected, and the third carrier C3 and the fourth ring gear R4 are directly interconnected; therefore, the speed ratios of the third and fourth sun gears S3 and S4, and the third carrier C3 and the fourth ring gear R4 are represented on each of the vertical lines labeled S3, S4 and C3, R4, respectively.

With respect to the single-pinion planetary gear 26 of the first compound planetary gear 15, assuming the interval between the vertical line for the common carrier C1C2 and the vertical line for the first sun gear S1 to be 1, the vertical line for the common ring gear R1R2 is located at an interval $\lambda 1$ from the vertical line for the common carrier C1C2 on the opposite side of the vertical line for the sun gear S1. With respect to the double-pinion planetary gear 27, assuming the interval between the vertical line for the common carrier C1C2 and the vertical line for the second sun gear S2 to be 1, the vertical line for the common ring gear R1R2 is located at an interval $\lambda 2$ from the vertical line for the common carrier C1C2 on the same side as the vertical line for the second sun gear S2. With respect to the single-pinion planetary gear 26 of the second compound planetary gear 16, assuming each of the intervals between the vertical lines for the third and fourth carriers C3 and C4 and the vertical line for the third and fourth sun gears S3 and S4 to be 1, respectively, the vertical lines for the third and fourth ring gears R3 and R4 are located at intervals $\lambda 3$ and $\lambda 4$ from the vertical lines for the third and fourth carriers C3 and C4, respectively, on the opposite side of the vertical line for the third and fourth sun gears S3 and S4. In the velocity diagram, the points are labeled C-1 to C-3, B-1 to B-4, and F-1 where the first to third clutches C-1 to C-3, the first to fourth brakes B-1 to B-4, and the one-way clutch F-1, respectively, are selectively operated.

In the velocity diagram of the first compound planetary gear 15 created in this way, the elements corresponding to the four vertical lines are the first, second, third, and fourth elements in the order arranged from the right vertical line, whereas in the velocity diagram of the second compound planetary gear 16, the elements corresponding to the four vertical lines are the fifth, sixth, seventh, and eighth elements in the order arranged from the left vertical line. In the case of the first embodiment, the second sun gear S2 is the first element, the common ring gear R1R2 is the second element, the common carrier C1C2 is the third element, and the first sun gear S1 is the fourth element, for the first compound planetary gear 15, whereas for the second compound planetary gear 16, the third ring gear R3 is the fifth element, the third carrier C3 and the fourth ring gear R4 are the sixth element, the fourth carrier C4 is the seventh element, and the third and fourth sun gears S3 and S4 are the eighth element.

Figure 4:
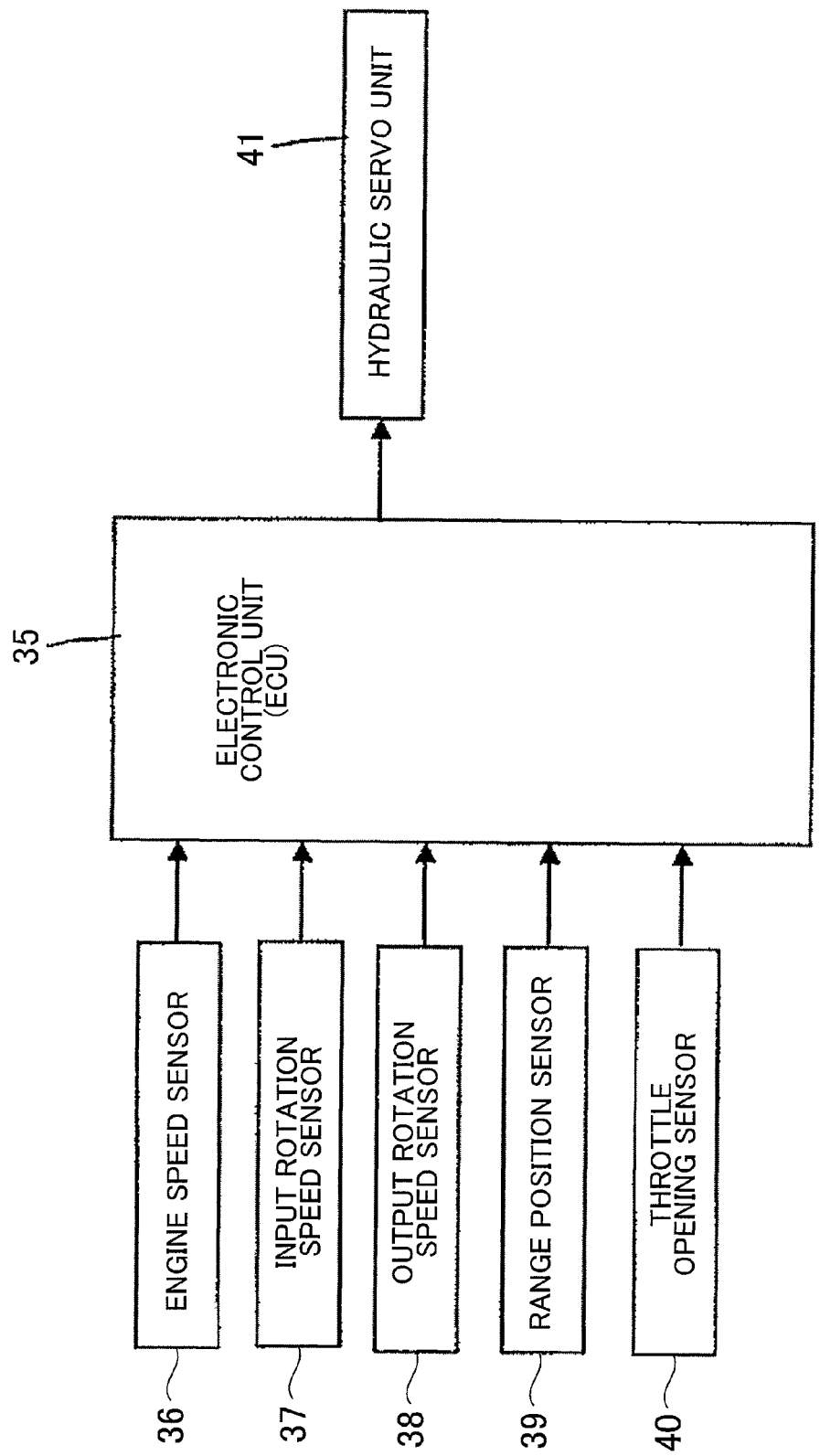
FIG. 4 is a block diagram showing a control unit.

A control unit of the automatic transmission 10 will be described below based on the block diagram shown in FIG. 4. A control unit 30 with a built-in CPU is provided with input signals detected by sensors such as an engine speed sensor 31 for detecting the rotation speed Ne on the engine side of the torque converter 11 to which the engine rotation is transmitted, an input rotation speed sensor 32 for detecting the rotation speed Ni of the input shaft 14, an output rotation speed sensor 33 for detecting the rotation speed Nv of the output shaft 17, a range position sensor 34 for sending out a detection signal D, N, or R when a shift lever is shifted to a drive range D, neutral range N, or reverse range R, respectively, and a throttle opening sensor 35 for detecting the accelerator pedal stroke Ss. Then, selecting an optimal shift speed based on these detection signals, the control unit 30 sends a control current to each of hydraulic servo units 86, 93, 100, 122, 133, 151, and 159 for operating each clutch or brake to selectively engage the first to third clutches C-1 to C-3 and the first to fourth brakes B-1 to B-4 as shown in the operation table of FIG. 2, thus achieving the eight forward speeds and two reverse speeds.

The first speed (1st) is achieved by engagement of the first clutch C-1 controlled by the control unit 30, and by automatic engagement of the one-way clutch F-1. Because the rotation of the input shaft 14 is input to the third and fourth sun gears S3 and S4 of the second compound planetary gear 16 through the first clutch C-1, and the third carrier C3 and the fourth ring gear R4 receive a reaction force being prevented by the one-way clutch F-1 from reverse rotation, the fourth carrier C4, that is consequently, the output shaft 17, is rotated forward with a speed reduced at a gear ratio of the first speed.

Because, at this time, the third clutch C-3 for selectively transmitting the rotation of the input shaft 14 to the second sun gear S2 is disengaged, it can be prevented that the first sun gear S1 of the first compound planetary gear 15 is rotated reversely to generate a large relative rotation with respect to the second sun gear S2.

When engine brake is applied on a downhill road, the rotation speed transmitted from driving wheels through the fourth carrier C4 to the third carrier C3 and the fourth ring gear R4 becomes larger than the rotation speed transmitted from the engine side, and therefore, the direction of the reaction force acting on the third carrier C3 and the fourth ring gear R4 is reversed. For this reason, when engine brake is applied, as shown by a white circle in parentheses (O) in FIG. 2, the third carrier C3 and the fourth ring gear R4 are fixed by engagement of the fourth brake B-4.

The second speed (2nd) is achieved by engagement of the first clutch C-1 and the second brake B-2. Because the rotation of the input shaft 14 is input to the third and fourth sun gears S3 and S4 of the second compound planetary gear 16 through the first clutch C-1, and the third ring gear R3 is fixed by the second brake B-2, the fourth carrier C4, that is consequently, the output shaft 17, is rotated forward with a speed reduced at a gear ratio of the second speed.

The third speed (3rd) is achieved by engagement of the first and third clutches C-1 and C-3, and of the first brake B-1. Because the rotation of the input shaft 14 is input to the second sun gear S2 of the first compound planetary gear 15 through the third clutch C-3, and because the rotation of the common ring gear R1R2, which is decelerated from the rotation of the input shaft 14 by fixing the common carrier C1C2 through the first brake B-1, is transmitted to the third ring gear R3 of the second compound planetary gear 16 directly connected to the common ring gear R1R2, and further because the rotation of the input shaft 14 is input to the third and fourth sun gears S3 and S4 of the second compound planetary gear 16 through the first clutch C-1, the fourth carrier C4, that is consequently, the output shaft 17, is rotated forward with a speed reduced at a gear ratio of the third speed.

The fourth speed (4th) is achieved by engagement of the first and third clutches C-1 and C-3, and of the third brake B-3. Because the rotation of the input shaft 14 is input to the second sun gear S2 of the first compound planetary gear 15 through the third clutch C-3, and because the rotation of the common ring gear R1R2, which is decelerated from the rotation of the input shaft 14 by fixing the first sun gear S1 through the third brake B-3, is transmitted to the third ring gear R3 of the second compound planetary gear 16 directly connected to the common ring gear R1R2, and further because the rotation of the input shaft 14 is input to the third and fourth sun gears S3 and S4 of the second compound planetary gear 16 through the first clutch C-1, the fourth carrier C4, that is consequently, the output shaft 17, is rotated forward with a speed reduced at a gear ratio of the fourth speed.

The fifth speed (5th) is achieved by engagement of the first and second clutches C-1 and C-2. The rotation of the input shaft 14 is input through the first and second clutches C-1 and C-2 to the directly interconnected third and fourth sun gears S3 and S4 of the second compound planetary gear 16, and to the directly interconnected third carrier C3 and fourth ring gear R4, and the second compound planetary gear 16 is rotated as a unit; thus, the fourth carrier C4, that is consequently, the output shaft 17, is rotated forward at the same rotation speed as the input shaft 14 with a gear ratio of the fifth speed.

The sixth speed (6th) is achieved by engagement of the second and third clutches C-2 and C-3, and of the third brake B-3. Because the rotation of the input shaft 14 is input to the second sun gear S2 of the first compound planetary gear 15 through the third clutch C-3, and because the rotation of the common ring gear R1R2, which is decelerated from the rotation of the input shaft 14 by fixing the first sun gear S1 through the third brake B-3, is transmitted to the third ring gear R3 of the second compound planetary gear 16 directly connected to the common ring gear R1R2, and further because the directly interconnected third carrier C3 and fourth ring gear R4 are connected to the input shaft 14 through the second clutch C-2, the fourth carrier C4, that is consequently, the output shaft 17, is rotated forward with a speed increased at a gear ratio of the sixth speed.

The seventh speed (7th) is achieved by engagement of the second and third clutches C-2 and C-3, and of the first brake B-1. Because the rotation of the input shaft 14 is input to the second sun gear S2 of the first compound planetary gear 15 through the third clutch C-3, and because the rotation of the common ring gear R1R2, which is decelerated from the rotation of the input shaft 14 by fixing the common carrier C1C2 through the first brake B-1, is transmitted to the third ring gear R3 of the second compound planetary gear 16 directly connected to the common ring gear R1R2, and further because the directly interconnected third carrier C3 and fourth ring gear R4 are connected to the input shaft 14 through the second clutch C-2, the fourth carrier C4, that is consequently, the output shaft 17, is rotated forward with a speed increased at a gear ratio of the seventh speed.

The eighth speed (8th) is achieved by engagement of the second clutch C-2 and the second brake B-2. Because the rotation of the input shaft 14 is input to the directly interconnected third carrier C3 and fourth ring gear R4 of the second compound planetary gear 16 through the second clutch C-2, and the third ring gear R3 is fixed by the second brake B-2, the fourth carrier C4, that is consequently, the output shaft 17, is rotated forward with a speed increased at a gear ratio of the eighth speed.

The first reverse speed (Rev 1) is achieved by engagement of the third clutch C-3 and of the first and fourth brakes B-1 and B-4. Because the rotation of the input shaft 14 is input to the second sun gear S2 of the first compound planetary gear 15 through the third clutch C-3, and because the rotation of the common ring gear R1R2, which is decelerated from the rotation of the input shaft 14 by fixing the common carrier C1C2 through the first brake B-1, is transmitted to the third ring gear R3 of the second compound planetary gear 16 directly connected to the common ring gear R1R2, and further because the directly interconnected third carrier C3 and fourth ring gear R4 are fixed through the fourth brake B-4, the fourth carrier C4, that is consequently, the output shaft 17, is rotated reversely with a speed reduced at a gear ratio of the first reverse speed.

The second reverse speed (Rev 2) is achieved by engagement of the third clutch C-3 and of the third and fourth brakes B-3 and B-4. Because the rotation of the input shaft 14 is input to the second sun gear S2 of the first compound planetary gear 15 through the third clutch C-3, and because the rotation of the common ring gear R1R2, which is decelerated from the rotation of the input shaft 14 by fixing the first sun gear S1 through the third brake B-3, is transmitted to the third ring gear R3 of the second compound planetary gear 16 directly connected to the common ring gear R1R2, and further because the directly interconnected third carrier C3 and fourth ring gear R4 are fixed through the fourth brake B-4, the fourth carrier C4, that is consequently, the output shaft 17, is rotated reversely with a speed reduced at a gear ratio of the second reverse speed.

If the gear ratios $\lambda 1$, $\lambda 2$, $\lambda 3$, and $\lambda 4$ (number of teeth of sun gear/number of teeth of ring gear) of the single-pinion planetary gears 26 for the first and second compound planetary gears 15 and 16 and of the double-pinion planetary gear 27 are set to, for example, 0.520, 0.440, 0.394, and 0.394, respectively, and when the gear ratio at each shift speed is calculated based on the formulas (1) and (2), the rotation ratio between the input shaft 14 and the output shaft 17, that is, the gear ratio is obtained as an appropriate value at each shift speed as follows: 3.538 at the first speed, 2.060 at the second speed, 1.405 at the third speed, 1.185 at the fourth speed, 1.000 at the fifth speed, 0.821 at the sixth speed, 0.713 at the seventh speed, 0.582 at the eighth speed, 3.168 at the first reverse speed, and 2.001 at the second reverse speed. Then, the steps between gear ratios are 1.717 between the first and second speeds, 1.467 between the second and third speeds, 1.186 between the third and fourth speeds, 1.185 between the fourth and fifth speeds, 1.218 between the fifth and sixth speeds, 1.151 between the sixth and seventh speeds, and 1.225 between the seventh and eighth speeds; thus, the gear ratio decreases at appropriate rates between shift speeds, enabling to obtain the appropriately spaced gear ratios for eight forward speeds and two reverse speeds by means of the automatic transmission according to the present embodiment.

Figure 5:
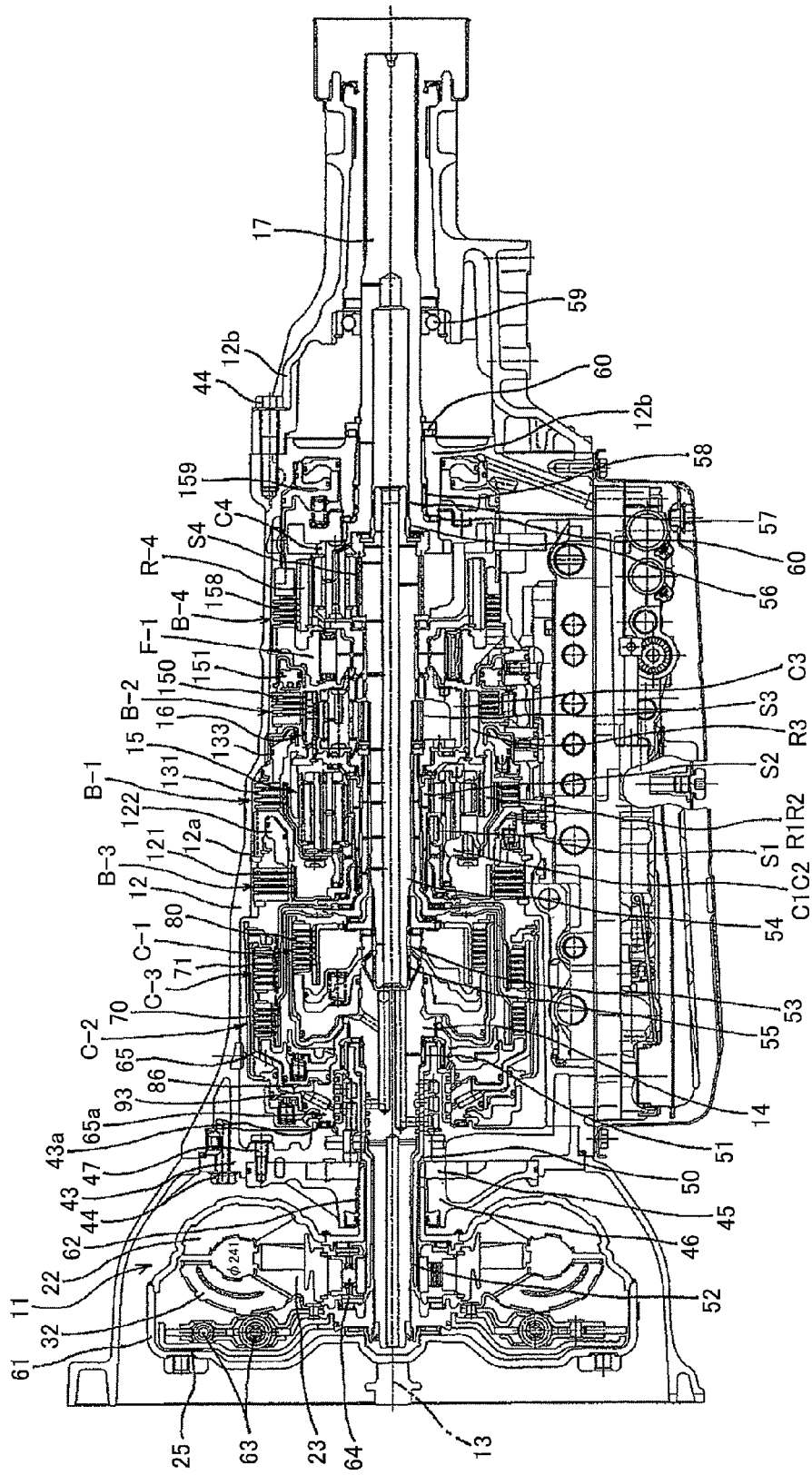
FIG. 5 is a cross-sectional view showing a specific overall structure of the automatic transmission.
Figure 6:
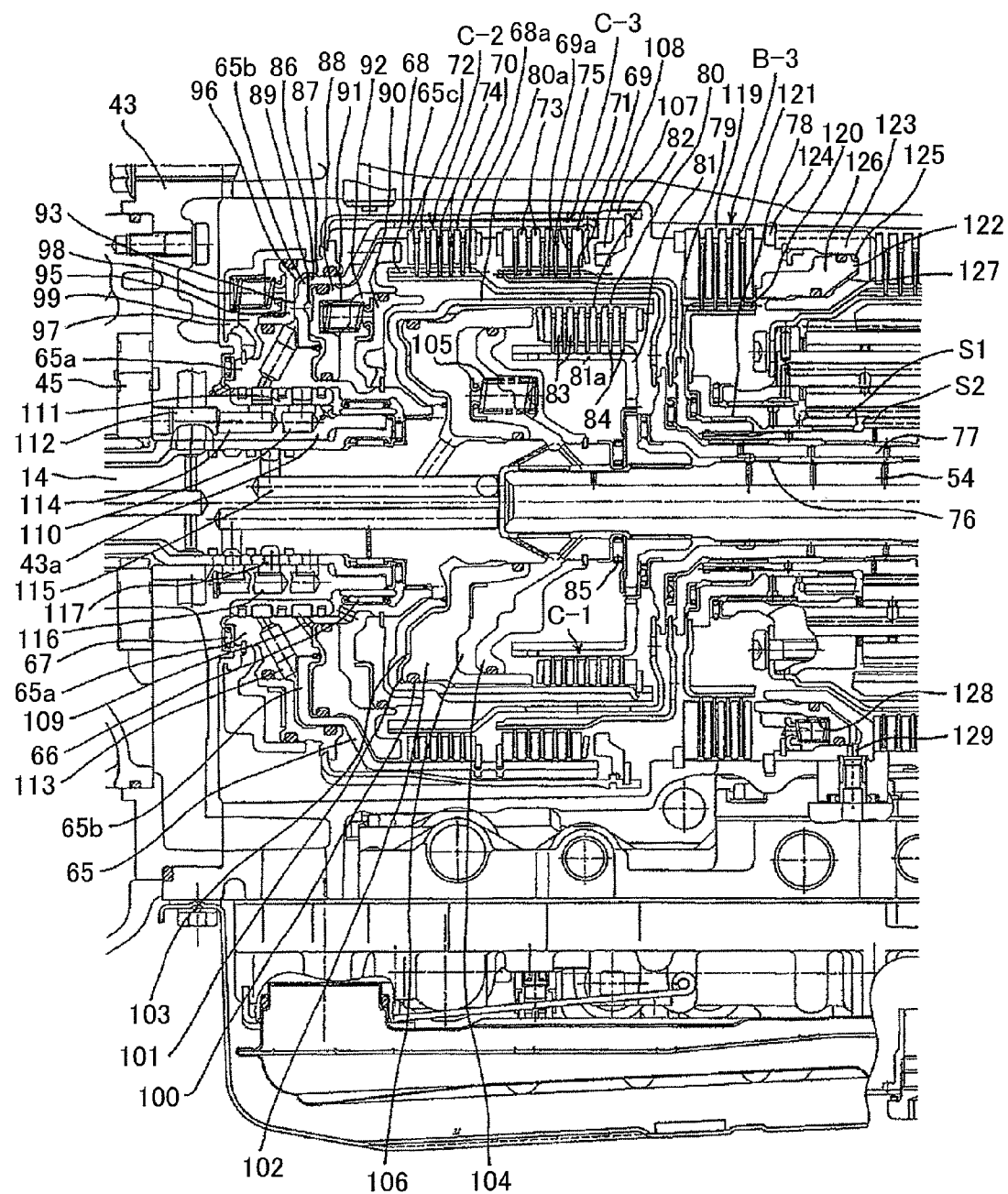
FIG. 6 is an enlarged cross-sectional view showing first to third clutches of FIG. 5.
Figure 7:
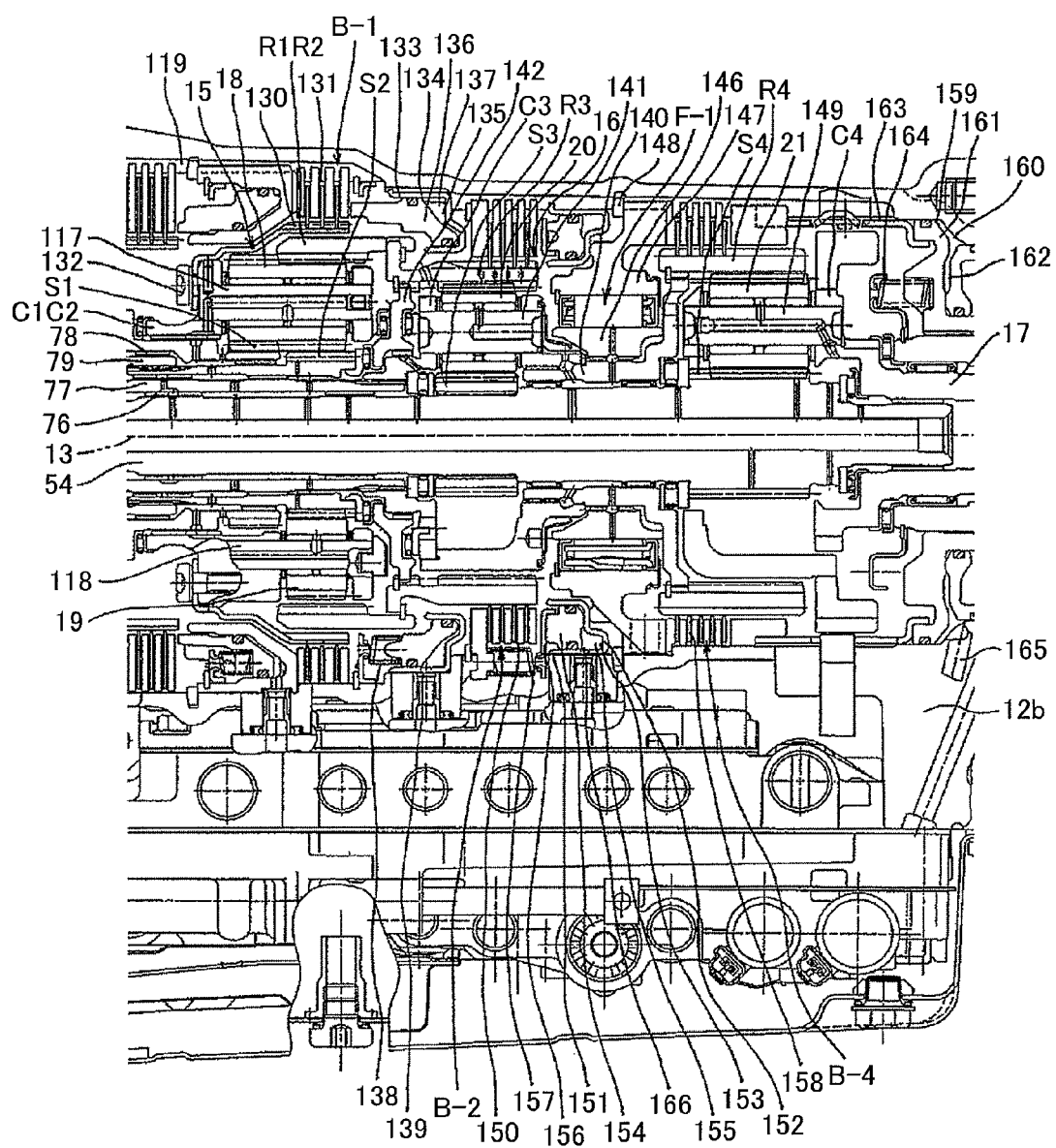
FIG. 7 is an enlarged cross-sectional view showing first and second compound planetary gears of FIG. 5.

The specific structure of the first embodiment will be described below with reference to FIGS. 4 to 6. The transmission case 12 is provided with a transmission case main body 12a having a cylindrical shape with a bottom to which a rear case 12b is fixed by bolts 44, and a front wall member 43 is fixed on the front end face of the transmission case main body 12a by the bolts 44. An oil pump body 46 for housing an oil pump 45 is fixed on the front end face of the front wall member 43 by bolts 47, and the rear side of the oil pump 45 is blocked by the front wall member 43. The front wall member 43 has a boss portion 43a extending rearward from its inner circumferential portion, and a stator shaft 50 is fixed by press-fit to the inner circumferential surface of the boss portion 43a. On the stator shaft 50, the input shaft 14 is rotatably supported by a needle bearing 51 and a metal bearing 52 about the common axis line 13 as a center.

The rear end portion of the input shaft 14 is provided with a bearing hole 53, and the tip end portion of an intermediate shaft 54 is coaxially and relatively rotatably supported in the bearing hole 53 by a metal bearing 55. The rear end portion of the intermediate shaft 54 is rotatably supported by a metal bearing 57 in a support hole 56 provided in the front end portion of the output shaft 17. The output shaft 17 is rotatably supported in a bottom wall 12b of the transmission case main body 12a and in the rear case 12b by a needle bearing 58, a ball bearing 59, and a thrust bearing 60.

In the oil pump body 46, a hollow rotor 61, which is connected to an unshown engine output shaft and internally provided with the pump impeller 22 of the fluid torque converter 11, is rotatably supported by a metal bearing 62. The turbine 32 facing the pump impeller 22 is fit with the tip end portion of the input shaft 14 so as to restrict relative rotation. Between the rotor 61 and the turbine 32, there is provided the lock-up clutch 25 for mechanically connecting them through a spring damper 63. The stator 23 is supported on the stator shaft 50 through a one-way clutch 64. Here, in the automatic transmission 10, the side of the fluid torque converter 11 is referred to as the front and the side of the output shaft 17 is referred to as the rear.

In the front portion of the transmission case 12, the first to third clutches C-1, C-2, and C-3 are arranged in parallel in a group, in front of the first compound planetary gear 15. On the boss portion 43a of the front wall member 43, a base end portion 65a of a common clutch drum 65 shared by the second and third clutches C-2 and C-3 is rotatably supported by a needle bearing 66 and a thrust bearing 67. The common clutch drum 65 is fit with the outer circumferential surface of the input shaft 14 through splines, on the inner circumferential surface of a cylindrical base end portion protruding rearward of the base end portion 65a, thus rotationally connected with the input shaft 14. In the common clutch drum 65, a bottom wall 65b extends radially from the base end portion 65a, and from the outer circumference of the bottom wall 65b, a cylindrical portion 65c is extending to the rear. On the inner circumference of the cylindrical portion 65c, a second and a third hub member 68 and 69 are sequentially arranged from the front. On the inner circumferential surface of the cylindrical portion 65c of the common clutch drum 65 and on the outer circumferential surface of cylindrical portions 68a, 69a of the second and third hub members 68, 69, a plurality of separator plates 72, 73 composing friction engagement portions 70, 71 of the second and third clutches C-2, C-3, and a plurality of friction plates 74, 75 are alternately engaged through splines. The second hub member 68 is radially bent at the rear and fixed by welding, etc. to a flange portion formed at the front end of a cylindrical connecting shaft 77 supported by the intermediate shaft 54 through a metal bearing 76. The rear end of the connecting shaft 77 is fitted with the third carrier C3 of the second compound planetary gear 16 through splines. The third hub member 69 is radially bent at the rear and fixed by welding, etc. to a radially extended portion of a connecting member 79. The connecting member 79 is, at its cylindrical portion extending to the rear, supported by a metal bearing 78 on the inner circumferential surface of the cylindrical portion extending to the front of the first sun gear S1 of the first compound planetary gear 15, and also fitted with the outer circumferential surface of the cylindrical portion extending to the front of the second sun gear S2 through splines.

The first clutch C-1 is arranged inside of the second and third clutches C-2 and C-3. A first clutch drum 80 of the first clutch C-1 is arranged on the inner circumference of the second hub member 68, and a cylindrical portion 80a of the first clutch drum 80 is extended to the front and then radially bent to be fixed to the input shaft 14 by welding, etc. A first hub member 81 is arranged on the inner circumference of the cylindrical portion 80a, and on the inner circumferential surface of the cylindrical portion 80a and the outer circumferential surface of a cylindrical portion 81a of the first hub member 81, a plurality of separator plates 83 and a plurality of friction plates 84 composing a friction engagement portion 82 of the first clutch C-1 are alternately engaged through splines. The first hub member 81 is radially bent at the rear and fitted with the intermediate shaft 54 through splines. A thrust bearing 85 is interposed between the front end face of the first hub member 81 and the rear end face of the input shaft 14.

In a hydraulic servo unit 86 of the second clutch C-2, a piston 88 is slidably fitted into a cylinder 87, which is formed by the base end cylindrical portion protruding to the rear of the base end portion 65a of the common clutch drum 65 and the inner circumferential bending portion of the bottom wall 65b, and a servo chamber 89 is oil-tightly defined between the cylinder 87 and the piston 88. On the base end cylindrical portion protruding to the rear of the base end portion 65a, a cancel plate 90 is fitted and restricted from moving toward rear by a snap ring. Between the cancel plate 90 and the rear face of the piston 88, a compression spring 91 for urging the separator plates 72 and the friction plates 74 in the disconnecting direction is interposed, and a cancel chamber 92 for canceling the centrifugal hydraulic pressure generated in the servo chamber 89 is provided. A contact portion protruding from the piston 88 toward the rear outside is facing the most front separator plate 72 of the second clutch C-2.

In the base end portion 65a of the common clutch drum 65, there is formed an oil passage 109 open to the servo chamber 89, then to the oil passage 109, an oil passage 110 formed in the boss portion 43a of the front wall member 43 in the direction of the axis line is communicated through a distributor 111, which is interposed between the outer circumferential surface of the boss portion 43a and the outer circumferential surface of the base end portion 65a, and the oil passage 110 is communicated to a discharge port of the oil pump 45 through an unshown hydraulic servo valve and an oil passage 112 formed in the boss portion 43a. When hydraulic pressure is supplied to the servo chamber 89 and the piston 88 is moved rearward, the contact portion of the piston 88 presses the separator plates 72, then the separator plates 72 and the friction plates 74 are pressed to contact each other to engage the second clutch C-2, and thus the rotation of the input shaft 14 is transmitted to the third carrier C3 through the second clutch C-2.

In a hydraulic servo unit 93 of the third clutch C-3, a piston 95 is slidably fitted to the front outer circumferential surface of the base end portion 65a of the common clutch drum 65 and to the outer circumferential bending portion of the bottom wall 65b, and a servo chamber 96 is oil-tightly defined by the outer circumferential surface of the base end portion 65a, the outer circumferential bending portion of the bottom wall 65b, and the piston 95. To the front end of the base end portion 65a, a cancel plate 97 is fitted and restricted from moving toward front by a snap ring. Between the cancel plate 97 and the piston 95, a compression spring 98 for urging the separator plates 73 and the friction plates 75 in the disconnecting direction is interposed, and a cancel chamber 99 for canceling the centrifugal hydraulic pressure generated in the servo chamber 96 is provided. A contact member 108 fitted to the rear end of an operating member 107, which is fixed to the rear end outer circumference of the piston 95 by welding, etc. to extend rearward the outside of the cylindrical portion 65c of the common clutch drum 65, and restricted from moving toward rear by a snap ring is facing the rearmost separator plate 73 of the third clutch C-3.

In the base end portion 65a of the common clutch drum 65, there is formed an oil passage 113 open to the servo chamber 96, then to the oil passage 113, an oil passage 114 formed in the boss portion 43a of the front wall member 43 in the direction of the axis line is communicated through the distributor 111, and the oil passage 114 is communicated to the discharge port of the oil pump 45 through the unshown hydraulic servo valve and the oil passage 112. When hydraulic pressure is supplied to the servo chamber 96 and the piston 95 is moved forward, the contact member 108 connected to the piston 95 presses the separator plates 73, then the separator plates 73 and the friction plates 75 are pressed to contact each other to engage the third clutch C-3, and thus the rotation of the input shaft 14 is transmitted to the second sun gear S2 through the third clutch C-3.

As described above, because the hydraulic servo units 86 and 93 of the second and third clutches C-2 and C-3 are provided on the front face side and rear face side, respectively, of the bottom wall 65b in the common clutch drum 65, the hydraulic servo units 86 and 93 of the second and third clutches C-2 and C-3 can be arranged in a small space. In other words, the servo chamber 89 of the hydraulic servo unit 86 of the second clutch C-2 is defined, on the rear face side of the bottom wall 65b of the common clutch drum 65, by the rear portion of the base end portion 65a of the common clutch drum 65 and the piston 88 slidably fitted into the inner circumferential surface of the bending portion of the bottom wall 65b of the common clutch drum 65, whereas the servo chamber 96 of the hydraulic servo unit 93 of the third clutch C-3 is defined, on the front face side of the bottom wall 65b of the common clutch drum 65, by the front portion of the base end portion 65a of the common clutch drum 65 and the piston 95 slidably fitted to the outer circumferential surface of the bending portion of the bottom wall 65b of the common clutch drum 65, and the oil passages 109 and 113 open to the servo chambers 89 and 96, respectively, are provided in the base end portion 65a. As a result, the hydraulic servo units 86 and 93 of the second and third clutches C-2 and C-3 can have a simple and compact structure, and also passages for supplying hydraulic pressure to the servo chambers 89 and 96 can be provided easily. In addition, in order to communicate the oil passages 109 and 113 open to the servo chambers 89 and 96 to the oil pump 45 through the unshown servo valve, the oil passages 110 and 114 are provided in the boss portion 43a of the front wall member 43, and the oil passages 109, 113 and the oil passages 110, 114 are communicated with each other through the distributor 111. Therefore, oil passages to supply and discharge hydraulic pressure to and from the servo chambers 89 and 96 of the second and third clutches C-2 and C-3 can be provided easily.

In a hydraulic servo unit 100 of the first clutch C-1, a piston 102 is slidably fitted into a cylinder 101, which is formed by the bottom portion of the first clutch drum 80 and the outer circumferential surface of the input shaft 14, and a servo chamber 103 is oil-tightly formed between the cylinder 101 and the piston 102. To the rear end portion of the input shaft 14, a cancel plate 104 is fitted and restricted from axial movement by a snap ring. Between the cancel plate 104 and the piston 102, a compression spring 105 for urging the separator plates 83 and the friction plates 84 in the disconnecting direction is interposed, and a cancel chamber 106 for canceling the centrifugal hydraulic pressure generated in the servo chamber 103 is provided. A contact portion protruding from the piston 102 toward the rear is facing the most front separator plate 83 of the first clutch C-1.

In the rear end portion of the input shaft 14, there is formed an oil passage 115 open to the servo chamber 103, then to the oil passage 115, an oil passage 116 formed in the boss portion 43a of the front wall member 43 in the direction of the axis line is communicated through a distributor 117, which is formed between the outer circumferential surface of the input shaft 14 and the inner circumferential surface of boss portion 43a, and the oil passage 116 is communicated to the discharge port of the oil pump 45 through the unshown hydraulic servo valve and the oil passage 112. When hydraulic pressure is supplied to the servo chamber 103 and the piston 102 is moved rearward, the contact portion of the piston 102 presses the separator plates 83, then the separator plates 83 and the friction plates 84 are pressed to contact each other to engage the first clutch C-1, and thus the rotation of the input shaft 14 is transmitted through the first clutch C-1 to the third and fourth sun gears S3 and S4, which are provided as a unit on the intermediate shaft 54.

The first compound planetary gear 15 is arranged on the common axis line 13 at the rear of the first clutch C-1, and the second sun gear S2 is rotatably supported on the outer circumference of the connecting shaft 77 by a metal bearing and engaged, at the front end, with the inner circumferential surface of the cylindrical portion of the connecting member 79 through splines. The first sun gear S1 is rotatably supported by a metal bearing across the cylindrical portion extending to the front of the second sun gear S2 and the cylindrical portion of the connecting member 79. The common carrier C1C2 is rotatably supported by a metal bearing on the cylindrical portion extending to the front of the first sun gear S1. On the common carrier C1C2, a pinion shaft 117 rotatably supporting the long pinion 18 meshing with the first sun gear S1 and a pinion shaft 118 rotatably supporting the pinion 19 meshing with the second sun gear S2 and the long pinion 18 are supported at both ends. The common ring gear R1R2 meshing with the long pinion 18 is directly connected to the third ring gear R3 of the second compound planetary gear 16. In other words, a flange portion formed at the front of the third ring gear R3 of the second compound planetary gear 16 is fitted to the cylindrical portion extending to the rear of the common ring gear R1R2 and restricted from moving toward rear by a snap ring; then, a projection extending radially outward from the flange portion of the third ring gear R3 is inserted into an engaging groove formed in the cylindrical portion of the common ring gear R1R2 to restrict relative rotation.

In this way, the cylindrical connecting shaft 77, which is directly connected to the third carrier C3 of the second compound planetary gear 16 and connectable to the input shaft 14 through the second clutch C-2, is rotatably supported by the intermediate shaft 54, then the second sun gear S2 of the first compound planetary gear 15 is rotatably supported by the connecting shaft 77, and the first sun gear S1 is rotatably supported by the second sun gear S2. Therefore, the rotation of the input shaft 14 can be transmitted to the third carrier C3 through the second clutch C-2 with a simple structure, and also the first and second sun gears S1 and S2 can be compactly arranged side by side in the direction of the axis line.

In the neighborhood of the inner circumferential wall surface at the central portion of the transmission case main body 12a in the direction of the axis line, the third brake B-3 capable of fixing the first sun gear S1 is arranged in front of the common ring gear R1R2 in the direction of the axis line. On the inner circumferential surface at the central portion of the transmission case main body 12a, a common spline 119 is cut in the direction of the axis line, and with the common spline 119 and a spline formed on the outer circumferential surface of a hub member 120, a plurality of separator plates and a plurality of friction plates composing a friction engagement portion 121 of the third brake B-3 are alternately engaged through splines. The portion bent radially inward from the front end of the hub member 120 is fixed to a flange portion formed at the front end of the first sun gear S1 by welding, etc. In a hydraulic servo unit 122 of the third brake B-3, a cylinder member 123 is fitted with the common spline 119 through splines, a piston 126 is slidably fitted into a cylinder 125 formed in the cylinder member 123, and a servo chamber 127 is oil-tightly formed between the cylinder 125 and the piston 126. A contact portion protruding from the piston 126 toward the front is facing the rearmost separator plate of the third brake B-3. The piston 126 is urged in the direction of separating the separator plates and friction plates by a spring force of a compression spring 128. A port 129 to supply and discharge hydraulic pressure to and from the servo chamber 127 is opened in the cylinder member 125. When hydraulic pressure is supplied to the servo chamber 127 and the piston 126 is moved forward, the contact portion of the piston 126 presses the separator plates, and the separator plates and the friction plates are pressed to contact each other to engage the first brake B-3. The cylinder member 123 is sandwiched between a shoulder formed at the rear end portion of the common spline 119 and a snap ring 124 to restrict movement in the direction of the axis line.

The first brake B-1 is arranged outside of the first compound planetary gear 15. With the common spline 119 and a spline formed on the outer circumferential surface of a hub member 130, a plurality of separator plates and a plurality of friction plates composing a friction engagement portion 131 of the first brake B-1 are alternately engaged through splines. The portion extending forward and bending radially from the hub member 130 is fixed to the common carrier C1C2 by a bolt 132. In a hydraulic servo unit 133 of the first brake B-1, a cylinder member 134 is fitted into a stepped hole provided in the transmission case main body 12a, a piston 136 is slidably fitted into a cylinder 135 formed in the cylinder member 134, and a servo chamber 137 is oil-tightly formed between the cylinder 135 and the piston 136. A contact portion protruding from the piston 136 toward the front is facing the rearmost separator plate of the first brake B-1. The piston 136 is urged in the direction of separating the separator plates and friction plates by a spring force of a compression spring 138. A port 139 to supply and discharge hydraulic pressure to and from the servo chamber 137 is opened in the cylinder member 134. When hydraulic pressure is supplied to the servo chamber 137 and the piston 136 is moved forward, the contact portion of the piston 136 presses the separator plates, and the separator plates and the friction plates are pressed to contact each other to engage the first brake B-1.

The second compound planetary gear 16 is arranged to the rear of the first compound planetary gear 15 on the common axis line 13. In the second compound planetary gear 16, the third sun gear S3 is attached by fitting to the intermediate shaft 54, and the third carrier C3 is spline-fitted to the spline formed on the circumference of the rear end portion of the connecting shaft 77 and also rotatably supported by a cylindrical portion extending to the front of a connecting member 140 rotatably supported by a needle bearing on the intermediate shaft 54. On the third carrier C3, a pinion shaft 141 rotatably supporting the third pinion 20, which meshes with the third sun gear S3 and the third ring gear R3, is supported at both ends. A supporting body 142 is spline-fitted on the inner circumferential surface of the flange portion of the third ring gear R3, and the supporting body 142 is rotatably supported by a metal bearing on a cylindrical portion provided in a protruding manner to the front of the third carrier C3.

An inner race 146 of the one-way clutch F-1 is spline-fitted on the outer circumference of the connecting member 140. An outer race 147 of the one-way clutch F-1 is fitted with prevention of rotation into the stepped hole formed at the rear of the transmission case main body 12a, and restricted from moving in the direction of the axis line by a snap ring 148 and a step portion of the stepped hole.

The fourth sun gear S4 of the second compound planetary gear 16 is formed on the intermediate shaft 54, and the fourth carrier C4 is connected to a flange portion formed at a tip end of the output shaft 17. On the fourth carrier C4, a pinion shaft 149 rotatably supporting the fourth pinion 21, which meshes with the fourth sun gear S4 and the fourth ring gear R4, is supported at both ends. The fourth ring gear R4 is supported by spline fitting at the front cylindrical portion to a supporting portion extending radially outward from the rear end of the connecting member 140, and restricted from moving rearward by a snap ring.

In this way, the intermediate shaft 54, which is rotatably supported by the transmission case 12 on the common axis line between the input shaft 14 and the output shaft 17, is connectable to the input shaft 14 through the first clutch C-1, and the third sun gear S3 and the fourth sun gear S4 of the second compound planetary gear 16 are provided as a unit on the intermediate shaft 54. Therefore, the rotation of the input shaft 14 can be transmitted to the directly interconnected third and fourth sun gears S3 and S4 of the second compound planetary gear 16 with a simple and compact structure.

The second brake B-2 is arranged outside of the third ring gear R3. A plurality of separator plates and a plurality of friction plates composing a friction engagement portion 150 of the second brake B-2 are alternately engaged through the splines with a spline formed on the inner circumferential surface of the transmission case main body 12a and a spline formed on the outer circumferential surface of the third ring gear R3. In a hydraulic servo unit 151 of the second brake B-2, a cylinder member 152 contacting the outer race 147 to be restricted from rearward movement is fitted with prevention of rotation into an inner circumferential surface of a spline formed in the transmission case main body 12a, a piston 154 is slidably fitted into a cylinder 153 formed in the cylinder member 152, and a servo chamber 155 is oil-tightly formed between the cylinder 153 and the piston 154. The piston 154 is facing the rearmost separator plate of the second brake B-2 through a spring seat 156 contacting the front end of the piston 154. The piston 154 is urged in the direction of separating the separator plates and friction plates by a spring force of a compression spring 157 acting on the spring seat 156. A port 166 to supply and discharge hydraulic pressure to and from the servo chamber 155 is opened in the cylinder member 152. When hydraulic pressure is supplied to the servo chamber 155 and the piston 154 is moved forward, the piston 154 presses the rearmost separator plate through the spring seat 156, and the separator plates and the friction plates are pressed to contact each other to engage the second brake B-2.

The fourth brake B-4 is arranged outside of the fourth ring gear R4. A plurality of separator plates and a plurality of friction plates composing a friction engagement portion 158 of the fourth brake B-4 are alternately spline-engaged with a spline foamed on the inner circumferential surface of the rear end portion of the transmission case main body 12a and a spline formed on the outer circumferential surface of the fourth ring gear R4. In a hydraulic servo unit 159 of the fourth brake B-4, a piston 161 is slidably fitted into a cylinder 160 formed in the bottom wall 12b of the transmission case main body 12a, and a servo chamber 162 is oil-tightly formed between the cylinder 160 and the piston 161. The piston 161 is facing the rearmost separator plate of the fourth brake B-4 through a pressing member 163 contacting the front end of the piston 161. The piston 161 is urged in the direction of separating the separator plates and the friction plates by a spring force of a compression spring 164. An oil passage 165 to supply and discharge hydraulic pressure to and from the servo chamber 162 is opened in the bottom wall 12b. When hydraulic pressure is supplied to the servo chamber 162 and the piston 161 is moved forward, the piston 161 presses the rearmost separator plate through the pressing member 163, and the separator plates and the friction plates are pressed to contact each other to engage the fourth brake B-4.

Figure 8:
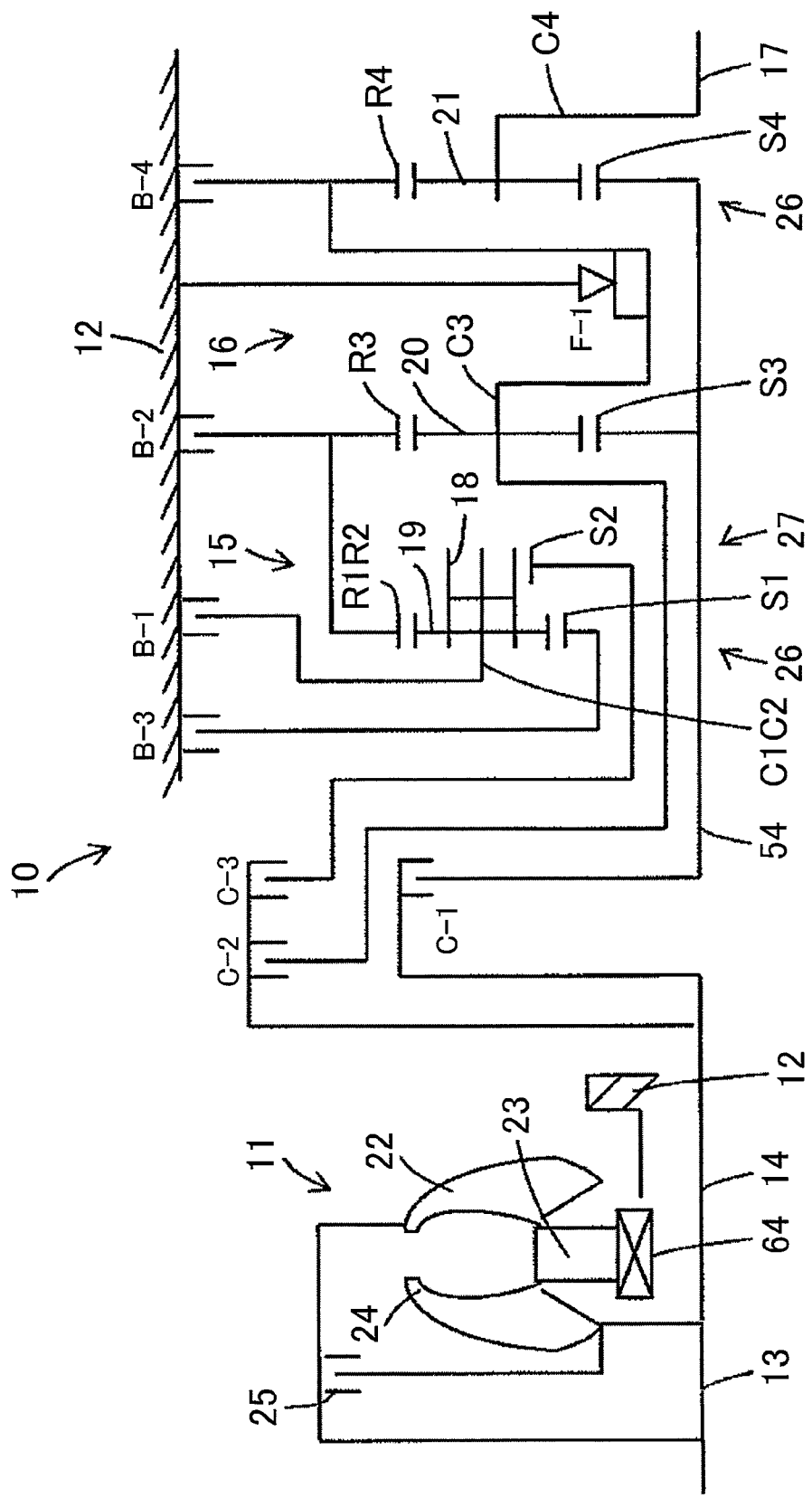
FIG. 8 is a skeleton diagram showing a second embodiment.

Next, a second non-limiting embodiment will be described. Since the second embodiment has a different first compound planetary gear 15 from that of the first embodiment, only this different portion will be described, while description of the other portions will be omitted by giving the same reference numerals to the same elements. As shown in FIG. 8, the first compound planetary gear 15 in the second embodiment is composed of first and second sun gears S1 and S2 respectively rotatably supported on the common axis line 13, a common carrier C1C2 rotatably supporting a pinion 19 and a long pinion 18 that are meshing with each other, and a common ring gear R1R2 that meshes with the first sun gear S1 through the pinion 19 and also meshes with the second sun gear S2 through the pinion 19 and the long pinion 18. The second sun gear S2 of the first compound planetary gear 15 is made connectable to the input shaft 14 through the third clutch C-3; the common ring gear R1R2 is directly connected to the third ring gear R3 of the second compound planetary gear 16; the common carrier C1C2 is made possible to be fixed through the first brake B-1; and the first sun gear S1 is made possible to be fixed through the third brake B-3. The state of engagement of each of the first to third clutches C-1 to C-3, the first to fourth brakes B-1 to B-4, and the one-way clutch F-1 at each shift speed is the same as in the case of the first embodiment shown in FIG. 2.

If the gear ratios λ1, λ2, λ3, and λ4 of the single-pinion planetary gears 26 for the first and second compound planetary gears 15 and 16 and of the double-pinion planetary gear 27 are set to, for example, 0.440, 0.480, 0.394, and 0.394, respectively, the gear ratio is obtained as an appropriate value at each shift speed as follows: 3.538 at the first speed, 2.060 at the second speed, 1.365 at the third speed, 1.147 at the fourth speed, 1.000 at the fifth speed, 0.849 at the sixth speed, 0.728 at the seventh speed, 0.582 at the eighth speed, 2.904 at the first reverse speed, and 1.855 at the second reverse speed. Then, the steps between gear ratios are 1.717 between the first and second speeds, 1.509 between the second and third speeds, 1.191 between the third and fourth speeds, 1.147 between the fourth and fifth speeds, 1.178 between the fifth and sixth speeds, 1.165 between the sixth and seventh speeds, and 1.251 between the seventh and eighth speeds; thus, the gear ratio decreases at appropriate rates between shift speeds, enabling to obtain the appropriately spaced gear ratios for eight forward speeds and two reverse speeds by means of the automatic transmission according to the present embodiment.

Figure 9:
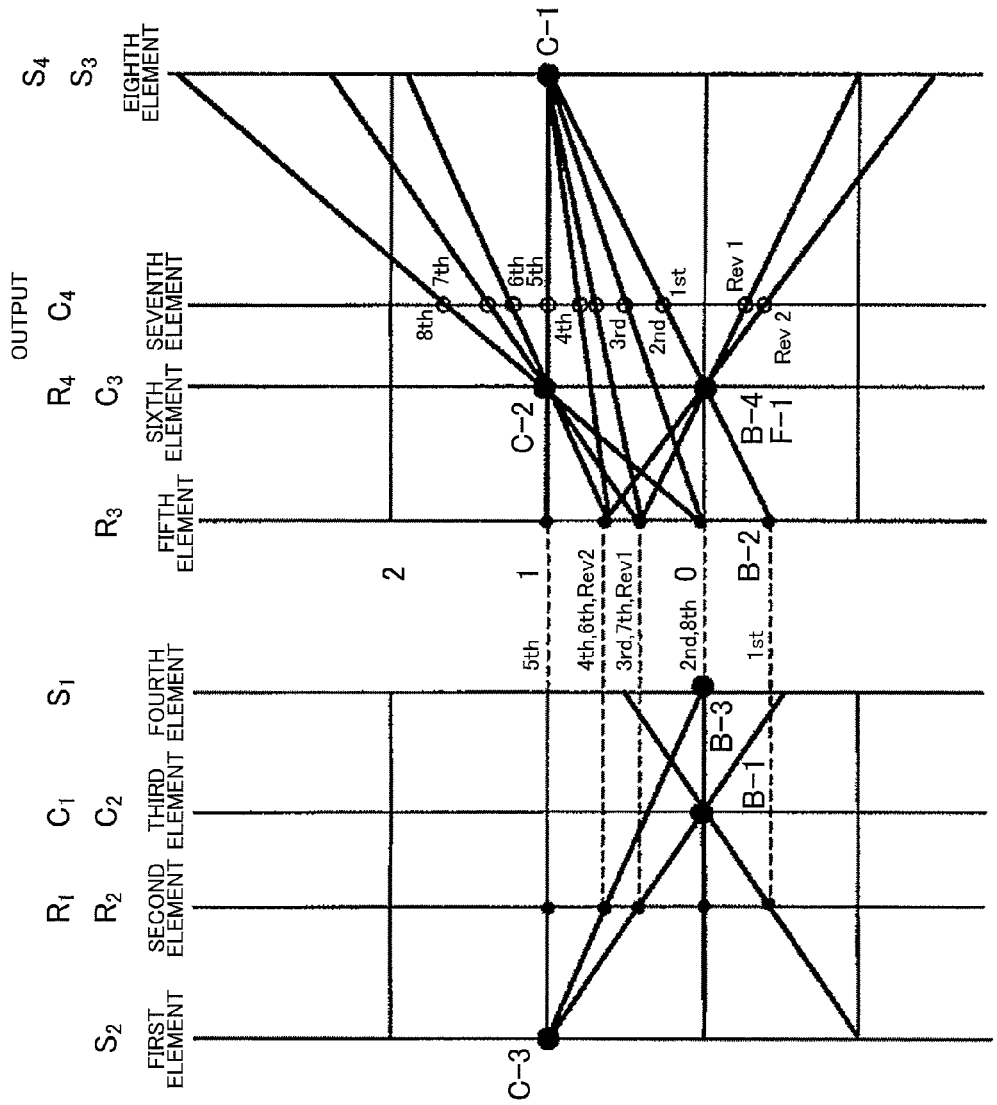
FIG. 9 is a velocity diagram showing a rotation ratio of each element of a planetary gear at each shift speed according to the second embodiment.

As shown in FIG. 9, in the velocity diagram of the first compound planetary gear 15 according to the second embodiment, the elements corresponding to the four vertical lines are assumed to be the first, second, third, and fourth elements in the order arranged from the left vertical line, whereas in the velocity diagram of the second compound planetary gear 16, the elements corresponding to the four vertical lines are assumed to be the fifth, sixth, seventh, and eighth elements in the order arranged from the left vertical line. In the case of the second embodiment, the second sun gear S2 is the first element, the common ring gear R1R2 is the second element, the common carrier C1C2 is the third element, and the first sun gear S1 is the fourth element, for the first compound planetary gear 15, whereas for the second compound planetary gear 16, the third ring gear R3 is the fifth element, the third carrier C3 and the fourth ring gear R4 are the sixth element, the fourth carrier C4 is the seventh element, and the third and fourth sun gears S3 and S4 are the eighth element.

As described above, compared with the known automatic transmission in which the first ring gear and the second ring gear are aligned with the third brake in the direction of the axis line, the automatic transmission according to the present embodiment, which has the common ring gear R1R2 of the first compound planetary gear aligned with the third brake B-3 in the direction of the axis line in the neighborhood of the inner circumferential wall surface of the transmission case 12, can have a shorter overall length, thereby making possible to achieve a small size, light weight, and low cost.

Figure 10:
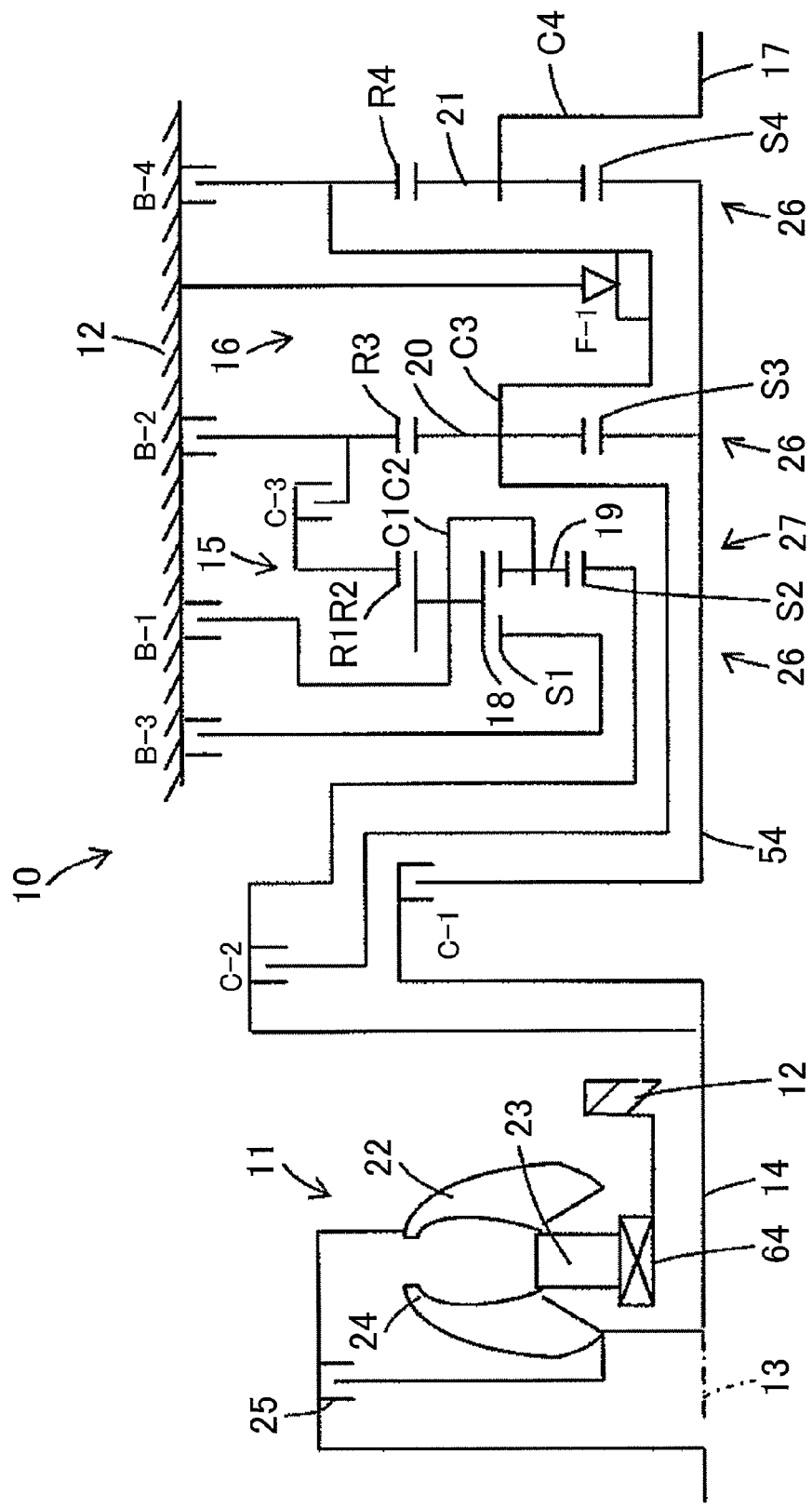
FIG. 10 is a skeleton diagram showing a third embodiment.

Next, a third non-limiting embodiment will be described. Since only the element that is made connectable through the third clutch C-3 differs between the third embodiment and the first embodiment, only this different portion will be described, while description of the other portions will be omitted by giving the same reference numerals to the same elements. As shown in FIG. 10, in the third embodiment, the second sun gear S2 of the first compound planetary gear 15 is directly connected to the input shaft 14, and the common ring gear R1R2 is made connectable to the third ring gear R3 of the second compound planetary gear 16 through the third clutch C-3.

Figure 11:
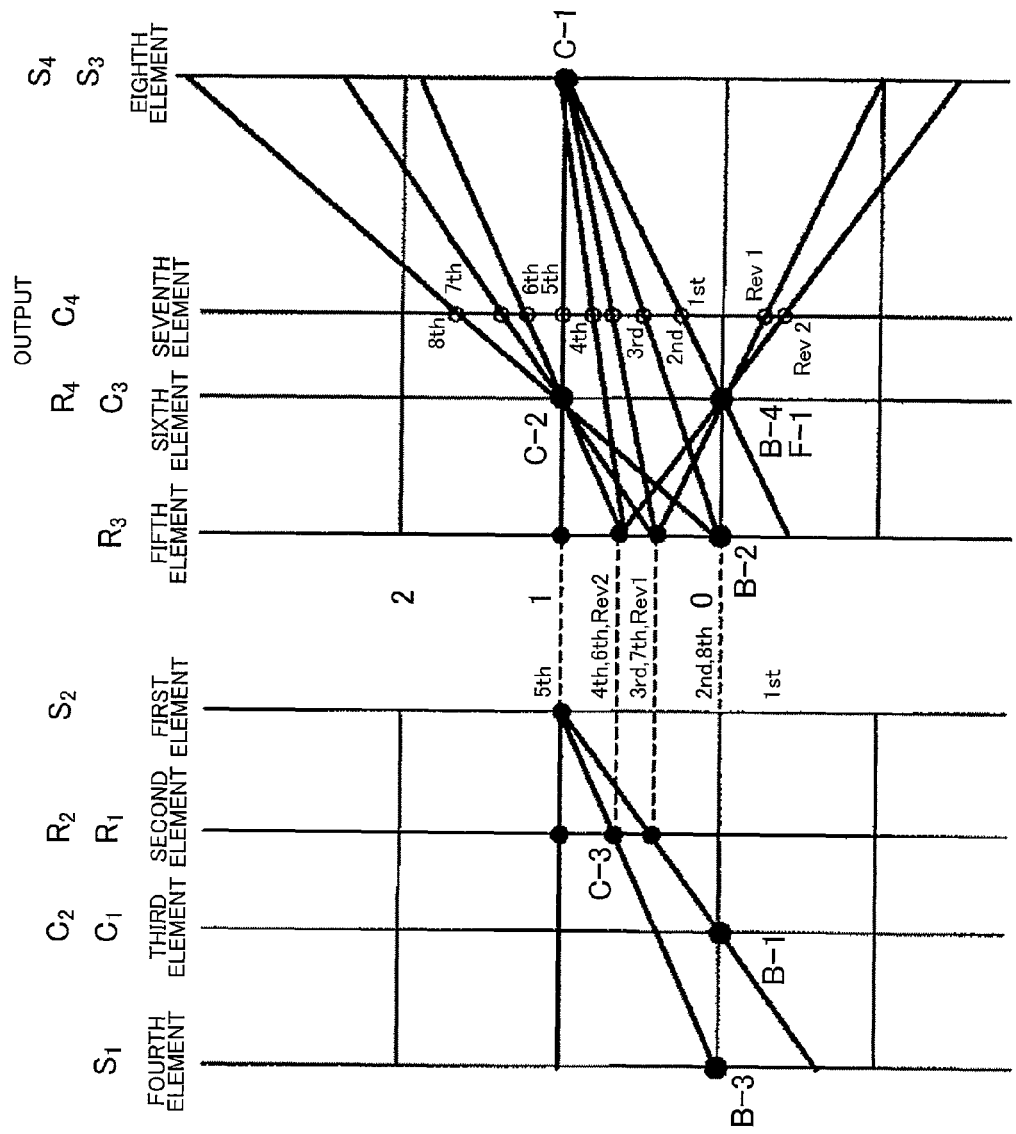
FIG. 11 is a velocity diagram showing a rotation ratio of each element of a planetary gear at each shift speed according to the third embodiment.

The velocity diagrams of the first and second compound planetary gears 15 and 16 are almost the same as those of the first embodiment except for the element connected by the third clutch C-3, as shown in FIG. 11. Because the common ring gear R1R2 of the first compound planetary gear 15 and the third ring gear R3 of the second compound planetary gear 16 are selectively connected to each other through the third clutch C-3, the speed ratios of the common ring gear R1R2 and the third ring gear R3, each of which is indicated on each of the vertical lines labeled R1R2 and R3 in the velocity diagrams of the first and second compound planetary gears 15 and 16 shown side by side in FIG. 11, become equal to each other only when the third clutch C-3 is engaged at the third to seventh speeds 3rd to 7th, and at the first and second reverse speeds Rev 1 and Rev 2.

An automatic transmission 10 according to the third embodiment can also achieve the eight forward speeds and two reverse speeds by selectively engaging the first to third clutches C-1 to C-3 and the first to fourth brakes B-1 to B-4, as shown in the operation table of FIG. 2.

At the first speed (1st), because the rotation of the input shaft 14 is input to the directly interconnected third and fourth sun gears S3 and S4 of the second compound planetary gear 16 through the first clutch C-1, and the directly interconnected third carrier C3 and the fourth ring gear R4 receive a reaction force being prevented by the one-way clutch F-1 from reverse rotation, the fourth carrier C4, that is consequently, the output shaft 17, is rotated forward with a speed reduced at a gear ratio of the first speed.

Because, at this time, the third clutch C-3 for selectively transmitting the rotation of the common ring gear R1R2 to the third ring gear R3 is disengaged, it can be prevented that the first sun gear S1 of the first compound planetary gear 15 is rotated reversely to generate a large relative rotation with respect to the second sun gear S2.

When engine brake is applied, the directly interconnected third carrier C3 and the fourth ring gear R4 are fixed by engagement of the fourth brake B-4.

At the second speed (2nd), because the rotation of the input shaft 14 is input to the directly interconnected third and fourth sun gears S3 and S4 of the second compound planetary gear 16 through the first clutch C-1, and the third ring gear R3 is fixed by the second brake B-2, the fourth carrier C4, that is consequently, the output shaft 17, is rotated forward with a speed reduced at a gear ratio of the second speed.

At the third speed (3rd), because the rotation of the input shaft 14 is directly input to the second sun gear S2 of the first compound planetary gear 15, and because the rotation of the common ring gear R1R2, which is decelerated from the rotation of the input shaft 14 by fixing the common carrier C1C2 through the first brake B-1, is transmitted to the third ring gear R3 of the second compound planetary gear 16 through the third clutch C-3, and further because the rotation of the input shaft 14 is input to the third and fourth sun gears S3 and S4 of the second compound planetary gear 16 through the first clutch C-1, the fourth carrier C4, that is consequently, the output shaft 17, is rotated forward with a speed reduced at a gear ratio of the third speed.

At the fourth speed (4th), because the rotation of the input shaft 14 is directly input to the second sun gear S2 of the first compound planetary gear 15, and because the rotation of the common ring gear R1R2, which is decelerated from the rotation of the input shaft 14 by fixing the first sun gear S1 through the third brake B-3, is transmitted to the third ring gear R3 of the second compound planetary gear 16 through the third clutch C-3, and further because the rotation of the input shaft 14 is input to the third and fourth sun gears S3 and S4 of the second compound planetary gear 16 through the first clutch C-1, the fourth carrier C4, that is consequently, the output shaft 17, is rotated forward with a speed reduced at a gear ratio of the fourth speed.

At the fifth speed (5th), the rotation of the input shaft 14 is input through the first and second clutches C-1 and C-2 to the directly interconnected third and fourth sun gears S3 and S4 of the second compound planetary gear 16, and to the directly interconnected third carrier C3 and fourth ring gear R4, and the second compound planetary gear 16 is rotated as a unit;

thus, the fourth carrier C4, that is consequently, the output shaft 17, is rotated forward at the same rotation speed as the input shaft 14 with a gear ratio of the fifth speed.

At the sixth speed (6th), because the rotation of the input shaft 14 is directly input to the second sun gear S2 of the first compound planetary gear 15, and because the rotation of the common ring gear R1R2, which is decelerated from the rotation of the input shaft 14 by fixing the first sun gear S1 through the third brake B-3, is transmitted to the third ring gear R3 of the second compound planetary gear 16 through the third clutch C-3, and further because the directly interconnected third carrier C3 and fourth ring gear R4 are connected to the input shaft 14 through the second clutch C-2, the fourth carrier C4, that is consequently, the output shaft 17, is rotated forward with a speed increased at a gear ratio of the sixth speed.

At the seventh speed (7th), because the rotation of the input shaft 14 is directly input to the second sun gear S2 of the first compound planetary gear 15, and because the rotation of the common ring gear R1R2, which is decelerated from the rotation of the input shaft 14 by fixing the common carrier C1C2 through the first brake B-1, is transmitted to the third ring gear R3 of the second compound planetary gear 16 through the third clutch C-3, and further because the directly interconnected third carrier C3 and fourth ring gear R4 are connected to the input shaft 14 through the second clutch C-2, the fourth carrier C4, that is consequently, the output shaft 17, is rotated forward with a speed increased at a gear ratio of the seventh speed.

At the eighth speed (8th), because the rotation of the input shaft 14 is input to the directly interconnected third carrier C3 and fourth ring gear R4 of the second compound planetary gear 16 through the second clutch C-2, and the third ring gear R3 is fixed by the second brake B-2, the fourth carrier C4, that is consequently, the output shaft 17, is rotated forward with a speed increased at a gear ratio of the eighth speed.

At the first reverse speed (Rev 1), because the rotation of the input shaft 14 is directly input to the second sun gear S2 of the first compound planetary gear 15, and because the rotation of the common ring gear R1R2, which is decelerated from the rotation of the input shaft 14 by fixing the common carrier C1C2 through the first brake B-1, is transmitted to the third ring gear R3 of the second compound planetary gear 16 through the third clutch C-3, and further because the directly interconnected third carrier C3 and fourth ring gear R4 are fixed through the fourth brake B-4, the fourth carrier C4, that is consequently, the output shaft 17, is rotated reversely with a speed reduced at a gear ratio of the first reverse speed.

At the second reverse speed (Rev 2), because the rotation of the input shaft 14 is directly input to the second sun gear S2 of the first compound planetary gear 15, and because the rotation of the common ring gear R1R2, which is decelerated from the rotation of the input shaft 14 by fixing the first sun gear S1 through the third brake B-3, is transmitted to the third ring gear R3 of the second compound planetary gear 16 through the third clutch C-3, and further because the directly interconnected third carrier C3 and fourth ring gear R4 are fixed through the fourth brake B-4, the fourth carrier C4, that is consequently, the output shaft 17, is rotated reversely with a speed reduced at a gear ratio of the second reverse speed.

Figure 12:
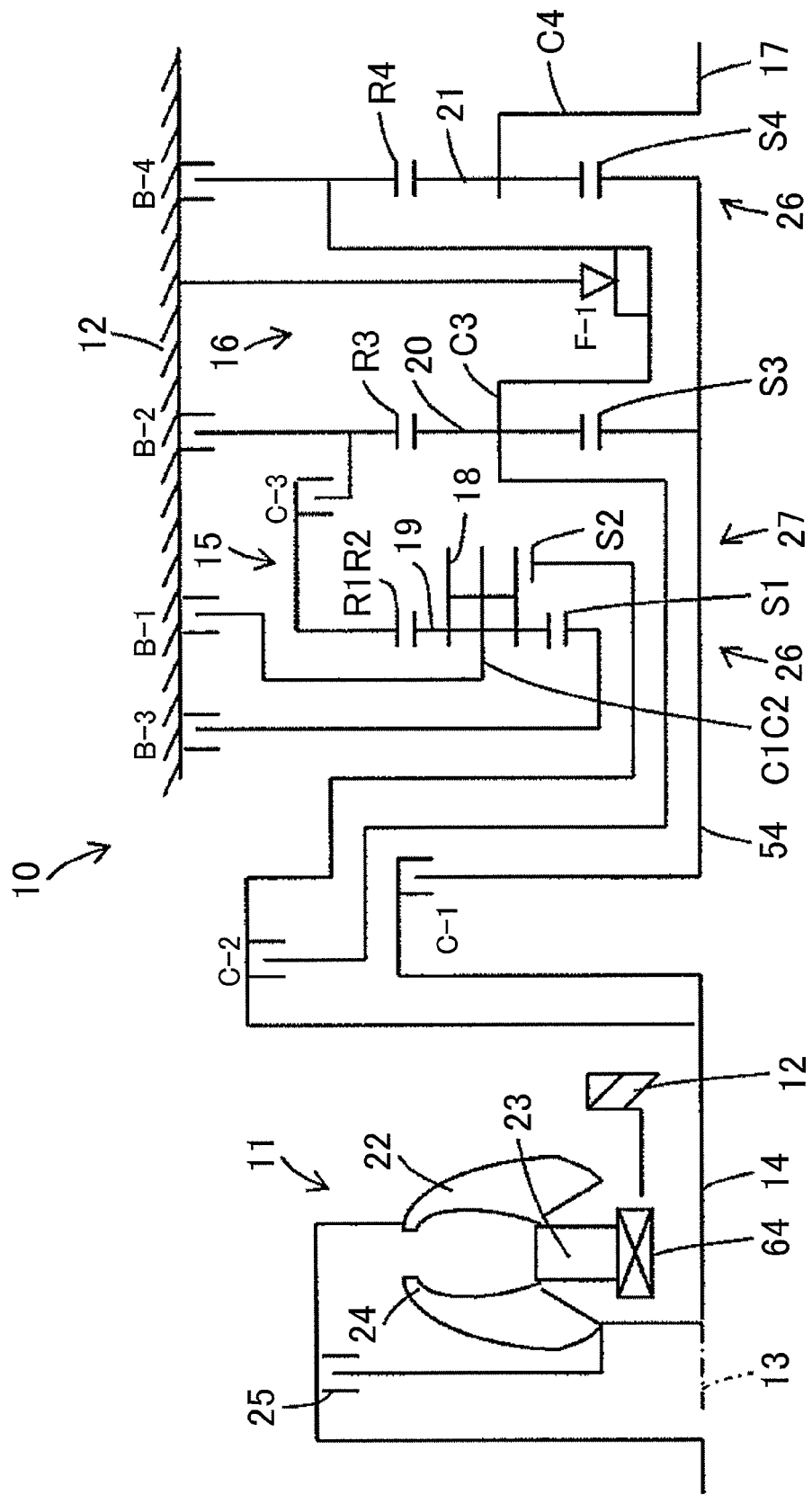
FIG. 12 is a skeleton diagram showing a fourth embodiment.

Next, a fourth non-limiting embodiment will be described. Since only the element that is made connectable through the third clutch C-3 differs between the fourth embodiment and the second embodiment, only this different portion will be described, while description of the other portions will be omitted by giving the same reference numerals to the same elements. As shown in FIG. 12, in the fourth embodiment, the second sun gear S2 of the first compound planetary gear 15 is directly connected to the input shaft 14, and the common ring gear R1R2 is made connectable to the third ring gear R3 of the second compound planetary gear 16 through the third clutch C-3.

Figure 13:
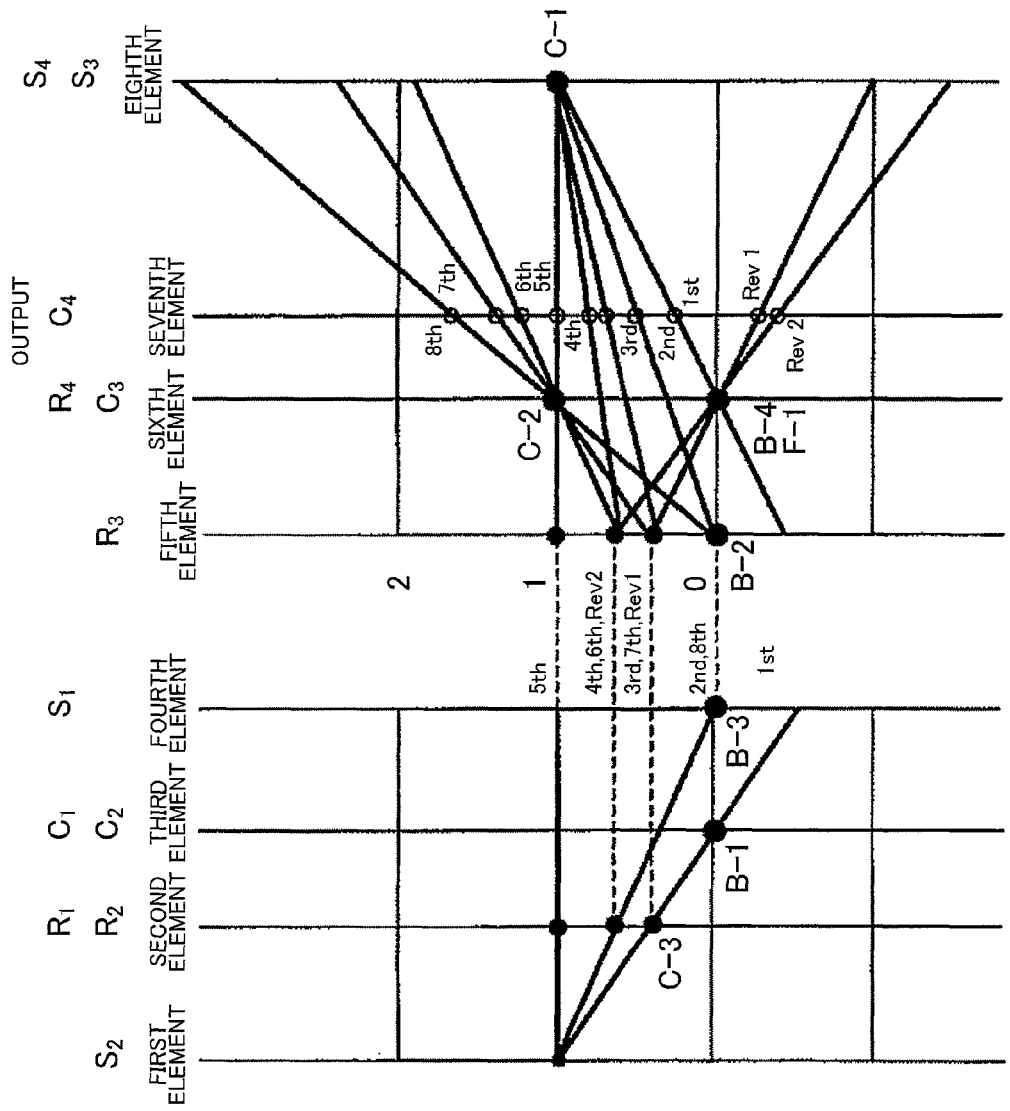
FIG. 13 is a velocity diagram showing a rotation ratio of each element of a planetary gear at each shift speed according to the fourth embodiment.

The velocity diagrams of the first and second compound planetary gears 15 and 16 are almost the same as those of the second embodiment except for the element connected by the third clutch C-3, as shown in FIG. 13. Because the common ring gear R1R2 of the first compound planetary gear 15 and the third ring gear R3 of the second compound planetary gear 16 are selectively connected to each other through the third clutch C-3, the speed ratios of the common ring gear R1R2 and the third ring gear R3, each of which is indicated on each of the vertical lines labeled R1R2 and R3 in the velocity diagrams of the first and second compound planetary gears 15 and 16 shown side by side in FIG. 13, become equal to each other only when the third clutch C-3 is engaged at the third to seventh speeds 3rd to 7th, and at the first and second reverse speeds Rev 1 and Rev 2.

An automatic transmission 10 according to the fourth embodiment can also achieve the eight forward speeds and two reverse speeds by selectively engaging the first to third clutches C-1 to C-3 and the first to fourth brakes B-1 to B-4, as shown in the operation table of FIG. 2.

Figure 14:
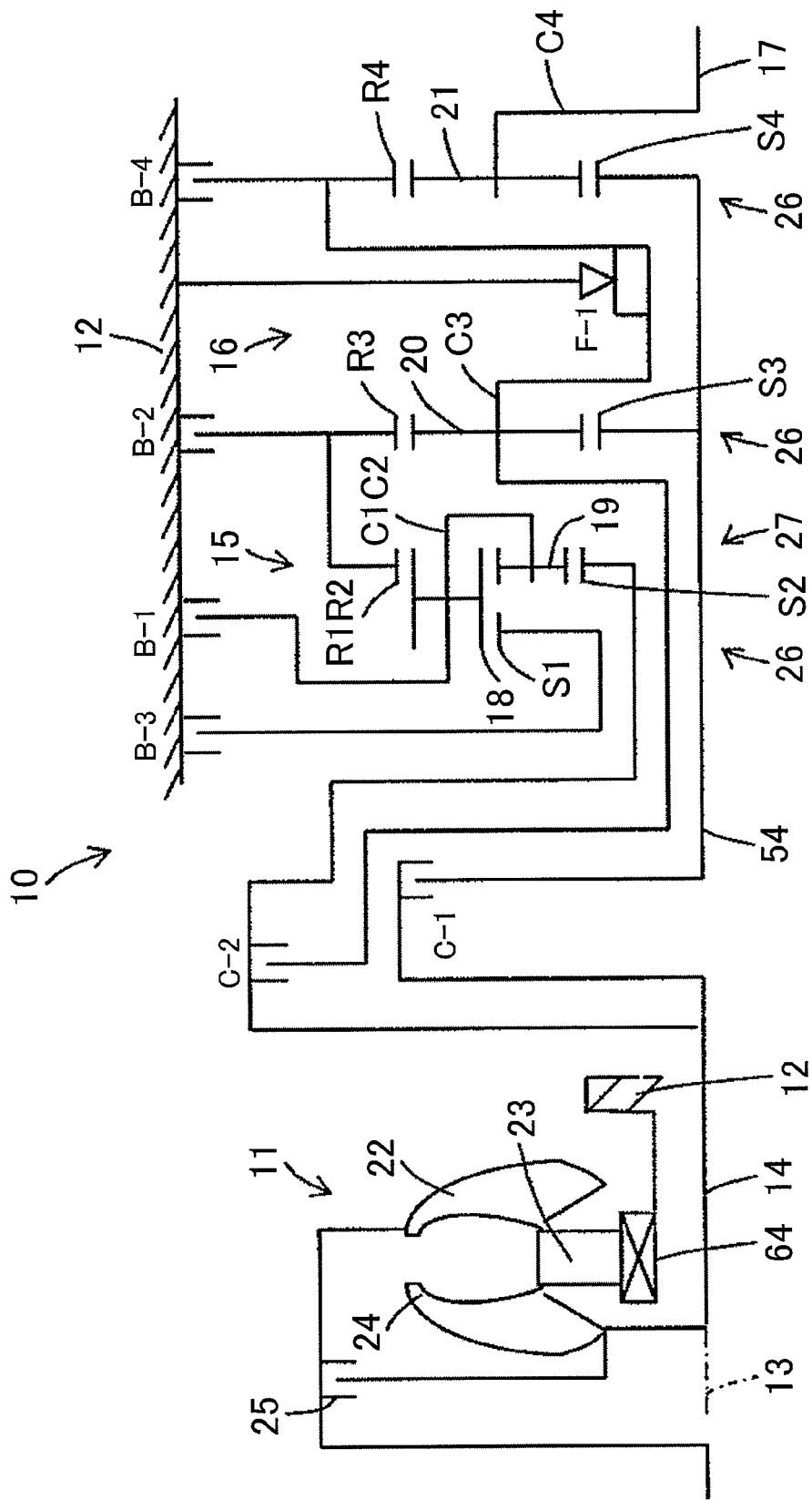
FIG. 14 is a skeleton diagram showing a fifth embodiment.

Next, a fifth non-limiting embodiment will be described. Since the fifth embodiment differs from the first embodiment only in that the second sun gear S2 of the first compound planetary gear 15 is directly connected to the input shaft 14 without providing the third clutch C-3, only this different portion will be described, while description of the other portions will be omitted by giving the same reference numerals to the same elements. As shown in FIG. 14, in the fifth embodiment, the second sun gear S2 of the first compound planetary gear 15 is directly connected to the input shaft 14, and the common ring gear R1R2 of the first compound planetary gear 15 is directly connected to the third ring gear R3 of the second compound planetary gear 16.

Figure 15:
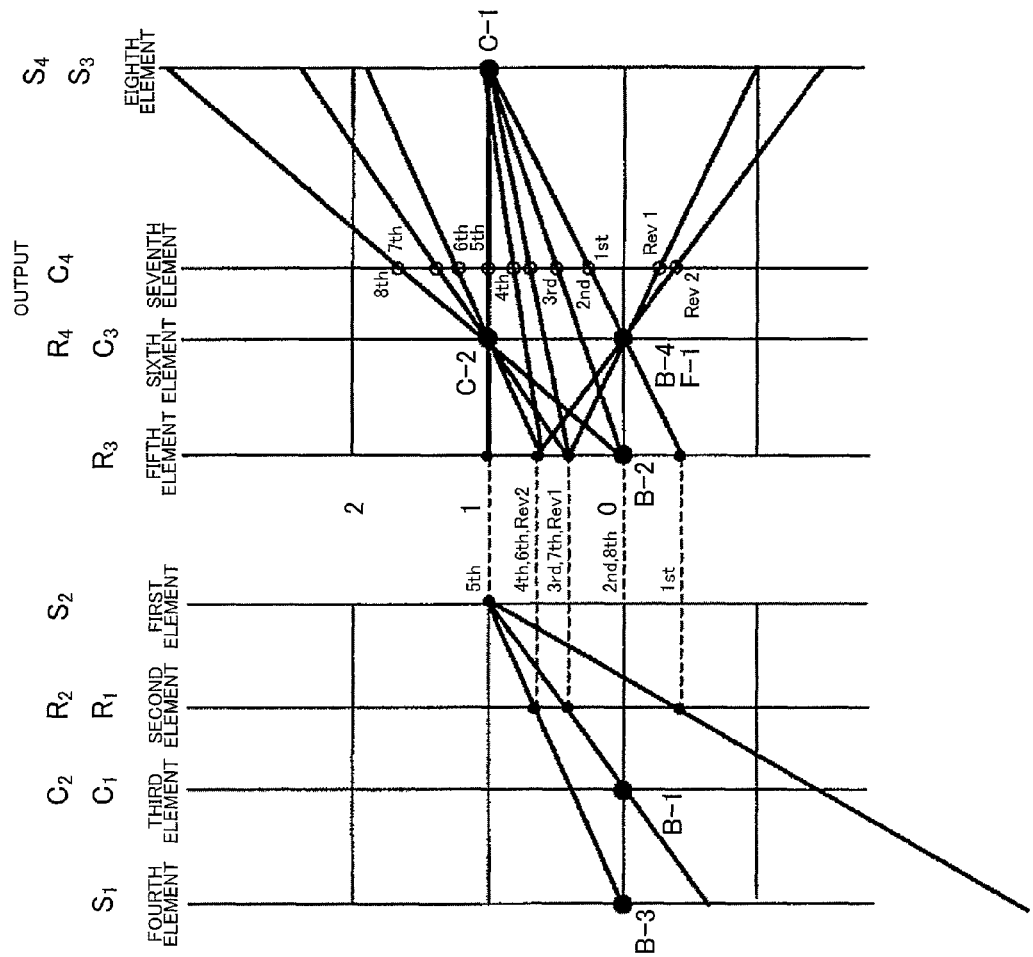
FIG. 15 is a velocity diagram showing a rotation ratio of each element of a planetary gear at each shift speed according to the fifth embodiment.

The velocity diagrams of the first and second compound planetary gears 15 and 16 are almost the same as those of the first embodiment except that the speed ratio of the second sun gear S2 of the first compound planetary gear 15 is always 1, as shown in FIG. 15.

An automatic transmission 10 according to the fifth embodiment can also achieve the eight forward speeds and two reverse speeds by selectively engaging the first and second clutches C-1 and C-2, and the first to fourth brakes B-1 to B-4, as shown in the operation table of FIG. 16.

At the first speed (1st), because the rotation of the input shaft 14 is input to the directly interconnected third and fourth sun gears S3 and S4 of the second compound planetary gear 16 through the first clutch C-1, and the directly interconnected third carrier C3 and the fourth ring gear R4 receive a reaction force being prevented by the one-way clutch F-1 from reverse rotation, the fourth carrier C4, that is consequently, the output shaft 17, is rotated forward with a speed reduced at a gear ratio of the first speed. When engine brake is applied, the directly interconnected third carrier C3 and the fourth ring gear R4 are fixed by engagement of the fourth brake B-4.

At the second speed (2nd), because the rotation of the input shaft 14 is input to the directly interconnected third and fourth sun gears S3 and S4 of the second compound planetary gear 16 through the first clutch C-1, and the third ring gear R3 is fixed by the second brake B-2, the fourth carrier C4, that is consequently, the output shaft 17, is rotated forward with a speed reduced at a gear ratio of the second speed.

At the third speed (3rd), because the rotation of the input shaft 14 is directly input to the second sun gear S2 of the first compound planetary gear 15, and because the rotation of the common ring gear R1R2, which is decelerated from the rotation of the input shaft 14 by fixing the common carrier C1C2 through the first brake B-1, is transmitted to the third ring gear R3 of the second compound planetary gear 16 directly connected to the common ring gear R1R2, and further because the rotation of the input shaft 14 is input to the third and fourth sun gears S3 and S4 of the second compound planetary gear 16 through the first clutch C-1, the fourth carrier C4, that is consequently, the output shaft 17, is rotated forward with a speed reduced at a gear ratio of the third speed.

At the fourth speed (4th), because the rotation of the input shaft 14 is directly input to the second sun gear S2 of the first compound planetary gear 15, and because the rotation of the common ring gear R1R2, which is decelerated from the rotation of the input shaft 14 by fixing the first sun gear S1 through the third brake B-3, is transmitted to the third ring gear R3 of the second compound planetary gear 16 directly connected to the common ring gear R1R2, and further because the rotation of the input shaft 14 is input to the third and fourth sun gears S3 and S4 of the second compound planetary gear 16 through the first clutch C-1, the fourth carrier C4, that is consequently, the output shaft 17, is rotated forward with a speed reduced at a gear ratio of the fourth speed.

At the fifth speed (5th), the rotation of the input shaft 14 is input through the first and second clutches C-1 and C-2 to the directly interconnected third and fourth sun gears S3 and S4 of the second compound planetary gear 16, and to the directly interconnected third carrier C3 and fourth ring gear R4, and the second compound planetary gear 16 is rotated as a unit; thus, the fourth carrier C4, that is consequently, the output shaft 17, is rotated forward at the same rotation speed as the input shaft 14 with a gear ratio of the fifth speed.

At the sixth speed (6th), because the rotation of the input shaft 14 is directly input to the second sun gear S2 of the first compound planetary gear 15, and because the rotation of the common ring gear R1R2, which is decelerated from the rotation of the input shaft 14 by fixing the first sun gear S1 through the third brake B-3, is transmitted to the third ring gear R3 of the second compound planetary gear 16 directly connected to the common ring gear R1R2, and further because the directly interconnected third carrier C3 and fourth ring gear R4 are connected to the input shaft 14 through the second clutch C-2, the fourth carrier C4, that is consequently, the output shaft 17, is rotated forward with a speed increased at a gear ratio of the sixth speed.

At the seventh speed (7th), because the rotation of the input shaft 14 is directly input to the second sun gear S2 of the first compound planetary gear 15, and because the rotation of the common ring gear R1R2, which is decelerated from the rotation of the input shaft 14 by fixing the common carrier C1C2 through the first brake B-1, is transmitted to the third ring gear R3 of the second compound planetary gear 16 directly connected to the common ring gear R1R2, and further because the directly interconnected third carrier C3 and fourth ring gear R4 are connected to the input shaft 14 through the second clutch C-2, the fourth carrier C4, that is consequently, the output shaft 17, is rotated forward with a speed increased at a gear ratio of the seventh speed.

At the eighth speed (8th), because the rotation of the input shaft 14 is input to the directly interconnected third carrier C3 and fourth ring gear R4 of the second compound planetary gear 16 through the second clutch C-2, and the third ring gear R3 is fixed by the second brake B-2, the fourth carrier C4, that is consequently, the output shaft 17, is rotated forward with a speed increased at a gear ratio of the eighth speed.

At the first reverse speed (Rev 1), because the rotation of the input shaft 14 is directly input to the second sun gear S2 of the first compound planetary gear 15, and because the rotation of the common ring gear R1R2, which is decelerated from the rotation of the input shaft 14 by fixing the common carrier C1C2 through the first brake B-1, is transmitted to the third ring gear R3 of the second compound planetary gear 16 directly connected to the common ring gear R1R2, and further because the directly interconnected third carrier C3 and fourth ring gear R4 are fixed through the fourth brake B-4, the fourth carrier C4, that is consequently, the output shaft 17, is rotated reversely with a speed reduced at a gear ratio of the first reverse speed.

At the second reverse speed (Rev 2), because the rotation of the input shaft 14 is directly input to the second sun gear S2 of the first compound planetary gear 15, and because the rotation of the common ring gear R1R2, which is decelerated from the rotation of the input shaft 14 by fixing the first sun gear S1 through the third brake B-3, is transmitted to the third ring gear R3 of the second compound planetary gear 16 directly connected to the common ring gear R1R2, and further because the directly interconnected third carrier C3 and fourth ring gear R4 are fixed through the fourth brake B-4, the fourth carrier C4, that is consequently, the output shaft 17, is rotated reversely with a speed reduced at a gear ratio of the second reverse speed.

Figure 17:
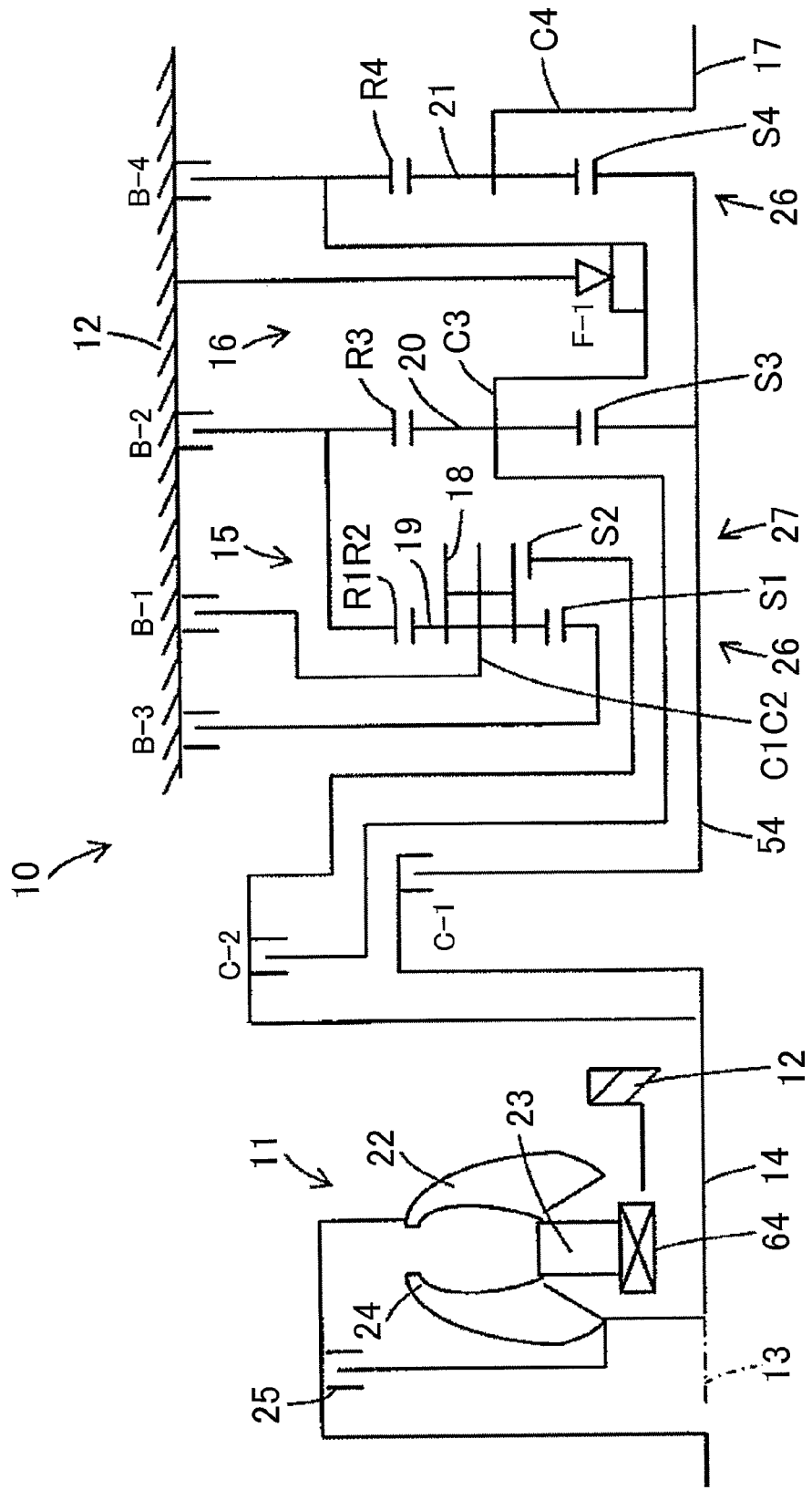
FIG. 17 is a skeleton diagram showing a sixth embodiment.

Next, a sixth non-limiting embodiment will be described. Since the sixth embodiment differs from the second embodiment only in that the second sun gear S2 of the first compound planetary gear 15 is directly connected to the input shaft 14 without providing the third clutch C-3, only this different portion will be described, while description of the other portions will be omitted by giving the same reference numerals to the same elements. As shown in FIG. 17, in the sixth embodiment, the second sun gear S2 of the first compound planetary gear 15 is directly connected to the input shaft 14, and the common ring gear R1R2 of the first compound planetary gear 15 is directly connected to the third ring gear R3 of the second compound planetary gear 16.

Figure 18:
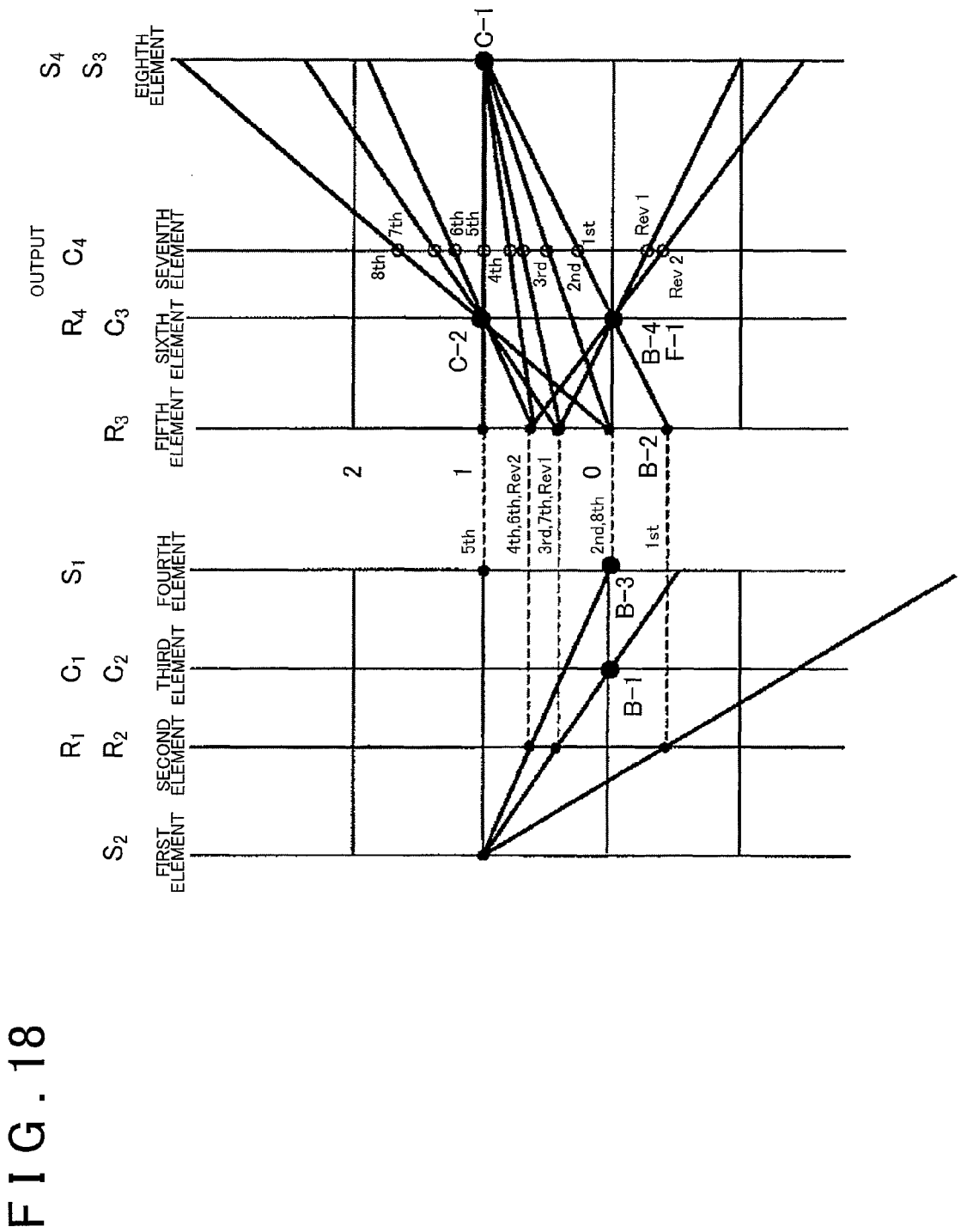
FIG. 18 is a velocity diagram showing a rotation ratio of each element of a planetary gear at each shift speed according to the sixth embodiment.

The velocity diagrams of the first and second compound planetary gears 15 and 16 are almost the same as those of the first embodiment except that the speed ratio of the second sun gear S2 of the first compound planetary gear 15 is always 1, as shown in FIG. 18. An automatic transmission 10 according to the sixth embodiment can also achieve the eight forward speeds and two reverse speeds by selectively engaging the first and second clutches C-1 and C-2, and the first to fourth brakes B-1 to B-4, as shown in the operation table of FIG. 16.

In the fifth and sixth embodiments, because the second sun gear S2 of the first compound planetary gear 15 is directly connected to the input shaft 14, and the common ring gear R1R2 of the first compound planetary gear 15 is directly connected to the third ring gear R3 of the second compound planetary gear 16 without providing the third clutch C-3, the automatic transmission 10 can be of small size, light weight, and low cost.

The invention claimed is:

1. An automatic transmission comprising:
an input shaft;
a first compound planetary gear having a first element, a second element, a third element, and a fourth element respectively corresponding in the order of arrangement to four elements that are sequentially arranged;
a second compound planetary gear having a fifth element, a sixth element, a seventh element, and an eighth element sequentially arranged and respectively corresponding in the order of arrangement to four elements that are sequentially arranged;

a second clutch for selectively transmitting rotation of the input shaft to the sixth element;

a first clutch for selectively transmitting rotation of the input shaft to the eighth element;

a first brake for selectively fixing the third element;

a second brake for selectively fixing the fifth element;

a third brake for selectively fixing the fourth element;

a fourth brake for selectively fixing the sixth element; and an output shaft directly connected to the seventh element, and a third clutch for selectively transmitting rotation of the input shaft to the first element, wherein, in the first compound planetary gear:

the first element is a second sun gear, the second element is a common ring gear that meshes with the second sun gear through a long pinion and a pinion, and also meshes with a first sun gear through one of the long pinion and the pinion, the third element is a common carrier that rotatably supports the long pinion and the pinion that intermesh with each other, and the fourth element is the first sun gear, and wherein the second element is directly connected to the fifth element.

2. The automatic transmission according to claim 1, wherein, in the second compound planetary gear, the fifth element is a third ring gear, the sixth element is a third carrier supporting a third pinion, and is also a fourth ring gear directly connected to the third carrier, the seventh element is a fourth carrier supporting a fourth pinion, and the eighth element is a third sun gear meshing with the third ring gear through the third pinion, and is also a fourth sun gear that is directly connected to the third sun gear and meshes with the fourth ring gear through the fourth pinion.

3. The automatic transmission according to claim 2, wherein, an intermediate shaft is rotatably supported on a common axis line between the input shaft and the output shaft, the intermediate shaft being connectable to the input shaft through the first clutch and being provided as a unit with the third sun gear and the fourth sun gear.

4. The automatic transmission according to claim 3, wherein, a cylindrical connecting shaft, which is directly connected to the third carrier and is also connectable to the input shaft through the second clutch, is rotatably supported by the intermediate shaft, the second sun gear is rotatably supported by the connecting shaft, and the first sun gear is rotatably supported by the second sun gear.

5. The automatic transmission according to claim 2, wherein:

the third clutch selectively connects the second element with the fifth element.

6. The automatic transmission according to claim 3, wherein:

the third clutch selectively connects the second element with the fifth element.

7. The automatic transmission according to claim 4, wherein:

the third clutch selectively connects the second element with the fifth element.

8. The automatic transmission according to claim 1, wherein:

the third clutch selectively connects the second element with the fifth element.

9. The automatic transmission according to claim 1, wherein the first to third clutches, the first compound planetary gear and the second compound planetary gear are arranged in an order of the first to third clutches, the first compound planetary gear and the second compound planetary gear in an axial direction.

* * * * *